(12) United States Patent
Ho et al.

(10) Patent No.: US 12,447,436 B2
(45) Date of Patent: Oct. 21, 2025

(54) $CO_2$ UTILIZATION FOR CO PRODUCTION VIA FUEL CELL ENABLED BY $CO_2$-SELECTIVE MEMBRANE

(71) Applicant: Ohio State Innovation Foundation, Columbus, OH (US)

(72) Inventors: W. S. Winston Ho, Columbus, OH (US); Yang Han, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 435 days.

(21) Appl. No.: 17/639,036

(22) PCT Filed: Aug. 26, 2020

(86) PCT No.: PCT/US2020/048055
§ 371 (c)(1),
(2) Date: Feb. 28, 2022

(87) PCT Pub. No.: WO2021/041581
PCT Pub. Date: Mar. 4, 2021

(65) Prior Publication Data
US 2022/0305437 A1 Sep. 29, 2022

Related U.S. Application Data

(60) Provisional application No. 62/891,811, filed on Aug. 26, 2019.

(51) Int. Cl.
*B01D 53/22* (2006.01)
*B01D 53/62* (2006.01)
(Continued)

(52) U.S. Cl.
CPC .......... *B01D 53/228* (2013.01); *B01D 53/62* (2013.01); *B01D 69/02* (2013.01); *B01D 69/142* (2013.01);
(Continued)

(58) Field of Classification Search
CPC ...... B01D 53/228; B01D 53/22; B01D 53/62; B01D 69/02; B01D 69/142; B01D 71/381;
(Continued)

(56) References Cited

U.S. PATENT DOCUMENTS 10,213,747 B2 2/2019 Ho et al.
10,322,379 B2 6/2019 Ho et al.
(Continued)

FOREIGN PATENT DOCUMENTS

CN 105727764 A 7/2016
WO 1998/41313 A1 9/1998
WO 2014/073582 A1 5/2014

OTHER PUBLICATIONS

International Search Report and Written Opinion, issued by the International Searching Authority (ISA/US) in PCT Application No. PCT/US2020/048055 on Jan. 19, 2021. 8 pages.
(Continued)

*Primary Examiner* — Frank M Lawrence, Jr.
(74) *Attorney, Agent, or Firm* — Meunier Carlin & Curfman LLC

(57) ABSTRACT

Provided herein are $CO_2$-selective membranes that can be used to efficiently separate $CO_2$ and CO. The membranes can be used to produce high-purity $CO_2$ and CO gas streams from a feed gas stream comprising a mixture of $CO_2$ and CO (e.g., an exhaust gas stream from a fuel cell, such as a solid oxide fuel cell). In this way, the membranes can be used with a solid oxide fuel cell system to covert $CO_2$ to CO.

15 Claims, 8 Drawing Sheets

(51) Int. Cl.
*B01D 69/02* (2006.01)
*B01D 69/14* (2006.01)
*B01D 71/38* (2006.01)
*B01D 71/44* (2006.01)
*B01D 71/48* (2006.01)
*B01D 71/60* (2006.01)
*B01D 71/68* (2006.01)
*H01M 8/04089* (2016.01)
*H01M 8/0606* (2016.01)
*H01M 8/0668* (2016.01)
*H01M 8/12* (2016.01)

(52) U.S. Cl.
CPC ......... *B01D 71/381* (2022.08); *B01D 71/441* (2022.08); *B01D 71/48* (2013.01); *B01D 71/60* (2013.01); *B01D 71/68* (2013.01); *H01M 8/04089* (2013.01); *H01M 8/0606* (2013.01); *H01M 8/0668* (2013.01); B01D 2256/20 (2013.01); B01D 2257/504 (2013.01); B01D 2258/0208 (2013.01); B01D 2323/30 (2013.01); B01D 2325/20 (2013.01); H01M 2008/1293 (2013.01)

(58) Field of Classification Search
CPC ...... B01D 71/441; B01D 71/48; B01D 71/60; B01D 71/68; B01D 2256/20; B01D 2257/504; B01D 2258/0208; B01D 2323/30; B01D 2325/20; B01D 71/44; H01M 8/04089; H01M 8/0606; H01M 8/0668; H01M 2008/1293; H01M 8/1231; Y02C 20/40; Y02E 60/50; Y02P 70/50
USPC ................................. 95/43, 51; 96/4, 11, 14
See application file for complete search history.

(56) References Cited

U.S. PATENT DOCUMENTS

| 10,835,847 | B2 | 11/2020 | Ho et al. | |
| 11,000,810 | B2 | 5/2021 | Ho et al. | |
| 11,358,093 | B2 | 6/2022 | Ho et al. | |
| 11,364,471 | B2 | 6/2022 | Ho et al. | |
| 11,772,052 | B2 | 10/2023 | Ho et al. | |
| 12,023,633 | B2 | 7/2024 | Ho et al. | |
| 12,172,136 | B2 | 12/2024 | Ho et al. | |
| 2010/0218680 | A1* | 9/2010 | Yeager | B01D 67/00113 96/13 |
| 2015/0151244 | A1* | 6/2015 | Ishizuka | B01J 20/043 422/212 |
| 2018/0147513 | A1* | 5/2018 | Ho | B01D 39/1692 |
| 2019/0140297 | A1 | 5/2019 | Gasda et al. | |
| 2019/0296375 | A1* | 9/2019 | Taku | H01M 8/2425 |
| 2022/0305436 | A1 | 9/2022 | Ho et al. | |
| 2023/0016870 | A1* | 1/2023 | Deng | B01D 71/601 |
| 2023/0060093 | A1 | 2/2023 | Ho et al. | |
| 2023/0182089 | A1* | 6/2023 | Ho | B01D 69/12 95/45 |
| 2023/0201762 | A1* | 6/2023 | Okada | B01D 71/401 95/51 |

OTHER PUBLICATIONS

Zou, Jian. Carbon dioxide-selective membranes and their applications in hydrogen processing. Dissertation, The Ohio State University. 2007. 85 pages.

Ho, W. S. Winston. Development of Novel Water-Gas Shift Membrane Reactor. The Ohio State University. 2004. 51 pages.

Wilen, S.H., et al., Strategies in Optical Resolutions. Tetrahedron 33:2725-2736. (1977).

Wilen, S.H. Tables of Resolving Agents and Optical Resolutions p. 268. 1972.

* cited by examiner

$CO_2$ UTILIZATION FOR CO PRODUCTION VIA FUEL CELL ENABLED BY $CO_2$-SELECTIVE MEMBRANE

CROSS-REFERENCE TO RELATED APPLICATIONS

This application is a national stage application filed under 35 U.S.C. § 371 of PCT/US2020/048055 filed Aug. 26, 2020, which claims benefit of priority of U.S. Provisional Application No. 62/891,811, filed Aug. 26, 2019, which is incorporated by reference in its entirety.

BACKGROUND

Fuel cells are electrochemical devices which can convert energy stored in fuels to electrical energy efficiencies. High temperature fuel cells include solid oxide fuel cells (SOFC) and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input. While such systems are attractive, improved membranes for gas separation are needed to achieve the promise of such systems in many applications.

SUMMARY

Described herein are $CO_2$-selective membranes that can be used to efficiently separate $CO_2$ and CO. The membranes can be used to produce high-purity $CO_2$ and CO gas streams from a feed gas stream comprising a mixture of $CO_2$ and CO (e.g., an exhaust gas stream from a fuel cell, such as a solid oxide fuel cell). In this sense, the membranes can be used with a solid oxide fuel cell system to covert $CO_2$ to CO.

$CO_2$-selective membranes for the separation of $CO_2$ and CO can comprise a support layer; and a selective polymer layer disposed on the support layer. The selective polymer layer can comprise a hydrophilic polymer matrix and an amine-containing carrier dispersed therein. The $CO_2$-selective membrane can exhibit a $CO_2$:CO selectivity of at least 500 at 100° C. and 2 atm feed pressure.

In some embodiments, the $CO_2$-selective membrane can exhibit a $CO_2$:CO selectivity of from 500 to 3000 at 100° C. and 2 atm feed pressure, or from 1000 to 2000 at 100° C. and 2 atm feed pressure.

In some embodiments, the $CO_2$-selective membrane can exhibit a $CO_2$:CO selectivity of at least 1000 at 100° C. and 2 atm feed pressure, such as a $CO_2$:CO selectivity of from 1000 to 3000 at 100° C. and 2 atm feed pressure, or from 1000 to 2000 at 100° C. and 2 atm feed pressure In some embodiments, the $CO_2$-selective membrane can exhibit a $CO_2$:CO selectivity of at least 100 at 170° C. and 2 atm feed pressure, such as a $CO_2$:COselectivity of from 100 to 500 at 170° C. and 2 atm feed pressure, or from 100 to 250 at 170° C. and 2 atm feed pressure.

In some embodiments, the $CO_2$-selective membrane can exhibit a $CO_2$ permeability of at least 1500 Barrer at 100° C. and 2 atm feed pressure, such as a $CO_2$ permeability of from 1500 Barrer to 10000 Barrer at 100° C. and 2 atm feed pressure, or a $CO_2$ permeability of from 2500 Barrer to 10000 Barrer at 100° C. and 2 atm feed pressure.

In some embodiments, the $CO_2$-selective membrane can exhibit a $CO_2$ permeability of at least 500 Barrer at 170° C. and 2 atm feed pressure, such as a $CO_2$ permeability of from 500 Barrer to 7500 Barrer at 170° C. and 2 atm feed pressure, or a $CO_2$ permeability of from 500 Barrer to 5000 Barrer at 170° C. and 2 atm feed pressure.

Thee hydrophilic polymer can comprise a polymer selected from the group consisting of polyvinyl alcohol, polyvinyl acetate, polyethylene oxide, polyvinylpyrrolidone, polyacrylamine, a polysiloxane, copolymers thereof, and blends thereof.

The amine-containing carrier can comprise an amine-containing polymer, an amine-containing mobile carrier, or a combination thereof.

In some embodiments, the amine-containing carrier can comprise an amine-containing polymer, such as polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers thereof, and blends thereof. In certain embodiments, the amine-containing polymer can comprise polyvinylamine.

In some embodiments, the amine-containing carrier can comprise an amine-containing mobile carrier. The amine-containing mobile carrier can have a molecular weight of less than 1,000 Da.

In some embodiments, the amine-containing mobile carrier can comprise a salt of a primary amine or a salt of a secondary amine.

In some embodiments, the amine-containing mobile carrier compound comprises a salt defined by a general formula below

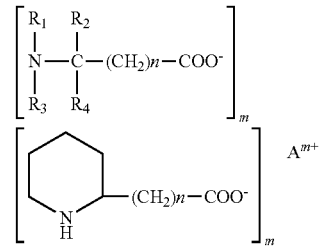

wherein $R_1$, $R_2$, $R_3$, and $R_4$ are hydrogen or hydrocarbon groups having from 1 to 4 carbon atoms, n is an integer ranging from 0 to 4, and $A^{m+}$ is a cation having a valence of 1 to 3, and m is an integer equal to the valence of the cation.

In some embodiments, the amine-containing mobile carrier comprises a salt selected from the group consisting of aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperidine-2-carboxylic acid- potassium salt, piperidine-2-carboxylic acid-lithium salt, piperidine-2-carboxylic acid-piperazine salt, piperidine-4-carboxylic acid-potassium salt, piperidine-4-carboxylic acid-lithium salt, piperidine-4-carboxylic acid-piperazine salt, piperidine-3-carboxylic acid- potassium salt, piperidine-3-carboxylic acid-lithium salt, piperidine-3-carboxylic acid-piperazine salt, and blends thereof.

In some embodiments, the amine-containing mobile carrier can comprise an amino acid salt, such as a compound defined by the formula below

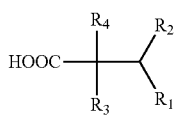

wherein, independently for each occurrence in the amino acid, each of $R_1$, $R_2$, $R_3$ and $R_4$ is selected from one of the following

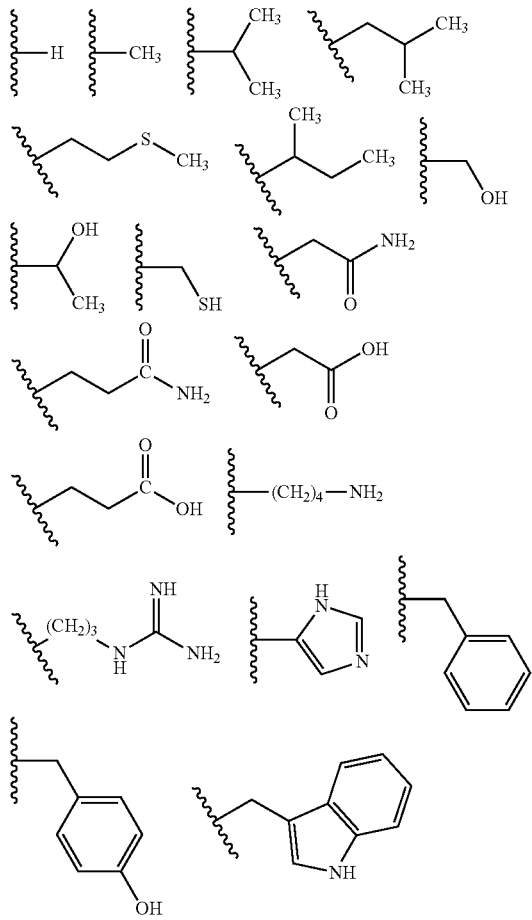

wherein at least one of $R_1$-$R_4$ comprises an amino group; or R1 and R3, together with the atoms to which they are attached, form a five-membered heterocycle defined by the structure below when n is 1, or a six-membered heterocycle defined by the structure below when n is 2

In certain embodiments, the amino acid salt can comprise a glycinate salt, a sarcosinate salt, or an aminoisobutyrate salt.

In some embodiments, the amine-containing mobile carrier can comprise a salt formed by reaction of an amine or a base with an amino acid, wherein the amine is selected from a group consisting of piperazine, 2-(1-piperazinyl)ethylamine, ethylenediamine, diethylenetriamine, triethylenetetramine, tetramethylguanidine, and blends thereof, wherein the base is selected from a group consisting of KOH, NaOH, LiOH, CsOH, $NH_4OH$, and blends thereof; and wherein the amino acid is selected from a group consisting of aminoisobutyric acid, sarcosine, glycine, proline, lysine, arginine, histidine, aspartic acid, glutamic acid, serine, threonine, asparagine, glutamine, cysteine, selenocysteine, alanine, valine, isoleucine, leucine, methionine, phenylalanine, tyrosine, tryptophan, pipecolinic acid, N,N-dimethylglycine, and blends thereof.

In some embodiments, the selective polymer layer can further comprise a cross-linking agent, such as formaldehyde, glutaraldehyde, maleic anhydride, glyoxal, divinylsulfone, toluenediisocyanate, trimethylol melamine, terephthalatealdehyde, epichlorohydrin, vinyl acrylate, a silane, an aminosilane, or a combination thereof.

The support layer can comprise a gas permeable polymer. In some embodiments, the gas permeable polymer can comprise a polymer chosen from polyamides, polyimides, polypyrrolones, polyesters, sulfone-based polymers, nitrile-based polymers, polymeric organosilicones, fluorinated polymers, polyolefins, copolymers thereof, and blends thereof. In certain embodiments, the gas permeable polymer can comprise polyethersulfone or polysulfone.

The support layer can comprise a gas permeable polymer disposed on a base. The base can comprise, for example, a non-woven fabric (e.g., a non-woven fabric comprising fibers formed from a polyester).

The $CO_2$-selective membrane can be configured in any suitable orientation to facilitate efficient interaction with a feed gas stream, such as a flat sheet, a spiral-wound, a hollow fiber, or a plate-and-frame configuration.

Also provided are methods of separating $CO_2$ and CO using the membranes described herein. These methods can comprise contacting a $CO_2$-selective membrane described herein with a feed gas stream comprising $CO_2$ and CO under conditions effective to afford transmembrane permeation of the $CO_2$. In this way, carbon dioxide present in the feed gas stream passes through the $CO_2$-selective membrane to reach the permeate side of the $CO_2$-selective membrane while CO remains on the retentate side of the $CO_2$-selective membrane. This can produce a $CO_2$-enriched gas stream on the retentate side of the membrane and a $CO_2$-enriched gas stream on the permeate side of the membrane. In some embodiments, the feed gas stream comprises exhaust gas from a fuel cell, such as a solid oxide fuel cell. In some embodiments, a paraffin, such as ethane or propane, is reacted at the anode of the fuel cell and converted to an olefin, such as ethylene or propylene (respectively). In some embodiments, the method can further comprise recycling the CO-enriched gas stream, the CO2-enriched gas stream, or a combination thereof back into inlet streams of a solid oxide fuel cell.

DETAILED DESCRIPTION

Definitions

Figure 1:
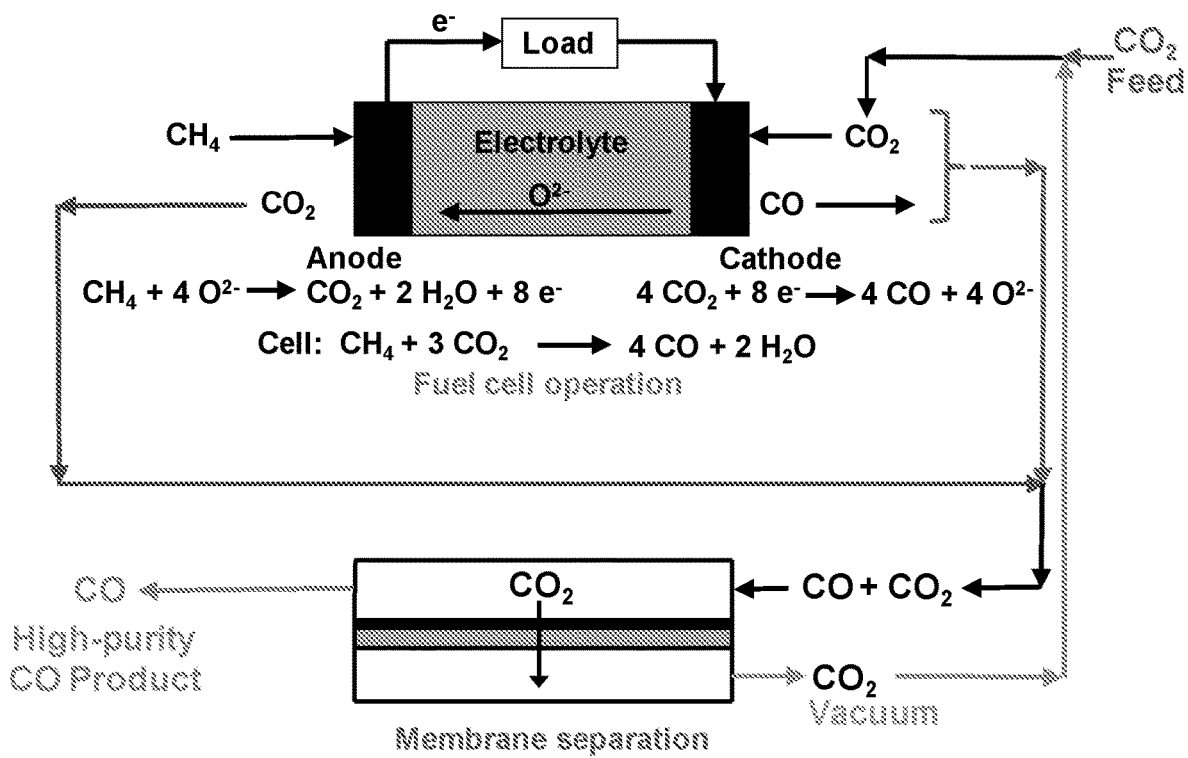
FIG. 1 is a schematic of $CO_2$ utilization via a fuel cell with $CH_4$ enabled by a $CO_2$-selective membrane.

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "Cn-m alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tent-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-l-yl, propyn-2-yl, and the like. In some embodiments, the alkynyl moiety contains 2 to 6, 2 to 4, or 2 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In some embodiments, the alkyl group has 1 to 6, 1 to 4, or 1 to 3 carbon atoms.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms.

As used herein, the term "$C_{n-m}$ alkoxycarbonyl" refers to a group of formula —C(O)O-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonyl" refers to a group of formula —C(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonylamino" refers to a group of formula —NHC(O)-alkyl, wherein the alkyl group has n to m carbon atoms. In some embodiments, the alkyl group has 1 to 6, 1 to 4, or 1 to 3 carbon atoms.

As used herein, the term "$C_{n\text{-}m}$ alkylsulfonylamino" refers to a group of formula —NHS(O)$_2$-alkyl, wherein the alkyl group has n to m carbon atoms. In some embodiments, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n\text{-}m}$ alkylaminosulfonyl" refers to a group of formula —S(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n\text{-}m}$ alkyl)aminosulfonyl" refers to a group of formula —S(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n\text{-}m}$ alkylaminosulfonylamino" refers to a group of formula —NHS(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n\text{-}m}$ alkyl)aminosulfonylamino" refers to a group of formula —NHS(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminocarbonylamino", employed alone or in combination with other terms, refers to a group of formula —NHC(O)NH$_2$.

As used herein, the term "$C_{n\text{-}m}$ alkylaminocarbonylamino" refers to a group of formula —NHC(O)NH(alkyl), wherein the alkyl group has n to m carbon atoms. In some embodiments, the alkyl group has 1 to 6, 1 to 4, or 1 to 3 carbon atoms.

As used herein, the term "di($C_{n\text{-}m}$ alkyl)aminocarbonylamino" refers to a group of formula —NHC(O)N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "$C_{n\text{-}m}$ alkylcarbamyl" refers to a group of formula —C(O)—NH(alkyl), wherein the alkyl group has n to m carbon atoms. In some embodiments, the alkyl group has 1 to 6, 1 to 4, or 1 to 3 carbon atoms.

As used herein, the term "thio" refers to a group of formula —SH.

As used herein, the term "$C_{n\text{-}m}$ alkylsulfinyl" refers to a group of formula —S(O)-alkyl, wherein the alkyl group has n to m carbon atoms. In some embodiments, the alkyl group has 1 to 6, 1 to 4, or 1 to 3 carbon atoms.

As used herein, the term "$C_{n\text{-}m}$ alkylsulfonyl" refers to a group of formula —S(O)$_2$-alkyl, wherein the alkyl group has n to m carbon atoms. In some embodiments, the alkyl group has 1 to 6, 1 to 4, or 1 to 3 carbon atoms.

As used herein, the term "amino" refers to a group of formula —NH$_2$.

As used herein, the term "aryl," employed alone or in combination with other terms, refers to an aromatic hydrocarbon group, which may be monocyclic or polycyclic (e.g., having 2, 3 or 4 fused rings). The term "$C_{n\text{-}m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to about 20 carbon atoms, from 6 to about 15 carbon atoms, or from 6 to about 10 carbon atoms. In some embodiments, the aryl group is a substituted or unsubstituted phenyl.

As used herein, the term "carbamyl" to a group of formula —C(O)NH$_2$.

As used herein, the term "carbonyl", employed alone or in combination with other terms, refers to a —C(=O)— group, which may also be written as C(O).

As used herein, the term "di($C_{n\text{-}m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "di($C_{n\text{-}m}$-alkyl)carbamyl" refers to a group of formula —C(O)N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "halo" refers to F, Cl, Br, or I. In some embodiments, a halo is F, Cl, or Br. In some embodiments, a halo is F or Cl.

As used herein, "$C_{n\text{-}m}$ haloalkoxy" refers to a group of formula —O-haloalkyl having n to m carbon atoms. An example haloalkoxy group is OCF$_3$. In some embodiments, the haloalkoxy group is fluorinated only. In some embodiments, the alkyl group has 1 to 6, 1 to 4, or 1 to 3 carbon atoms.

As used herein, the term "$C_{n\text{-}m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3\text{-}10}$). Ring-forming carbon atoms of a cycloalkyl group can be optionally substituted by oxo or llyridin (e.g., C(O) or C(S)). Cycloalkyl groups also include cycloalkylidenes. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In some embodiments, cycloalkyl is cyclopropyl, cyclobutyl, cyclopentyl, cyclohexyl, cyclopentyl, or llyridinell. In some embodiments, the cycloalkyl has 6-10 ring-forming carbon atoms. In some embodiments, cycloalkyl is llyridinell. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-10 ring atoms and 1, 2, 3 or 4 heteroatom ring members independently selected from nitrogen, sulfur and oxygen. In some embodiments, the heteroaryl has 5-6 ring atoms and 1 or 2 heteroatom ring members independently selected from nitrogen, sulfur and oxygen. In some embodiments, the heteroaryl is a five-membered or six-membereted heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include 12yridinel2ne-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or 12yridin (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl has 4-10, 4-7 or 4-6 ring atoms with 1 or 2 heteroatoms independently selected from nitrogen, oxygen, or sulfur and having one or more oxidized ring members.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a 12yridine-3-yl ring is attached at the 3-position.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone—enol pairs, amide—imidic acid pairs, lactam—lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

In some embodiments, the compounds described herein can contain one or more asymmetric centers and thus occur as racemates and racemic mixtures, enantiomerically enriched mixtures, single enantiomers, individual diastereomers and diastereomeric mixtures (e.g., including I- and (S)-enantiomers, diastereomers, (D)-isomers, (L)-isomers, (+) (dextrorotatory) forms, (-) (levorotatory) forms, the racemic mixtures thereof, and other mixtures thereof). Additional asymmetric carbon atoms can be present in a substituent, such as an alkyl group. All such isomeric forms, as well as mixtures thereof, of these compounds are expressly included in the present description. The compounds described herein can also or further contain linkages wherein bond rotation is restricted about that particular linkage, e.g. restriction resulting from the presence of a ring or double bond (e.g., carbon-carbon bonds, carbon-nitrogen bonds such as amide bonds). Accordingly, all cis/trans and E/Z isomers and rotational isomers are expressly included in the present description. Unless otherwise mentioned or indicated, the chemical designation of a compound encompasses the mixture of all possible stereochemically isomeric forms of that compound.

Optical isomers can be obtained in pure form by standard procedures known to those skilled in the art, and include, but are not limited to, diastereomeric salt formation, kinetic resolution, and asymmetric synthesis. See, for example, Jacques, et al., Enantiomers, Racemates and Resolutions (Wiley Interscience, New York, 1981); Wilen, S. H., et al., Tetrahedron 33:2725 (1977); Eliel, E. L. Stereochemistry of Carbon Compounds (McGraw-Hill, NY, 1962); Wilen, S. H. Tables of Resolving Agents and Optical Resolutions p. 268 (E. L. Eliel, Ed., Univ. of Notre Dame Press, Notre Dame, IN 1972), each of which is incorporated herein by reference in their entireties. It is also understood that the compounds described herein include all possible regioisomers, and mixtures thereof, which can be obtained in pure form by standard separation procedures known to those skilled in the art, and include, but are not limited to, column chromatography, thin-layer chromatography, and high-performance liquid chromatography.

$CO_2$-Selective Membranes

Described herein are $CO_2$-selective membranes. The $CO_2$-selective membranes can be used to efficiently separate $CO_2$ and CO. As such, the membranes can be used to produce high-purity $CO_2$ and CO gas streams from a feed gas stream comprising a mixture of $CO_2$ and CO (e.g., an exhaust gas stream from a fuel cell, such as a solid oxide fuel cell). In this sense, the membranes can be used with a solid oxide fuel cell system to covert $CO_2$ to CO.

The $CO_2$-selective membrane can comprise a support layer; and a selective polymer layer disposed on the support layer. The selective polymer layer can comprise a hydrophilic polymer matrix and an amine-containing carrier dispersed therein.

In some embodiments, the $CO_2$-selective membrane can exhibit a $CO_2$:CO selectivity of at least 500 (e.g., at least 750, at least 1000, at least 1250, at least 1500, at least 1750, at least 2000, at least 2250, at least 2500, or at least 2750) at 100° C. and 2 atm feed pressure. In some embodiments, the $CO_2$-selective membrane can exhibit a $CO_2$:CO selectivity of 3000 or less (e.g., 2750 or less, 2500 or less, 2250 or less, 2000 or less, 1750 or less, 1500 or less, 1250 or less, 1000 or less, or 750 or less) at 100° C. and 2 atm feed pressure.

The $CO_2$-selective membrane can exhibit a $CO_2$:CO selectivity at 100° C. and 2 atm feed pressure ranging from any of the minimum values described above to any of the maximum values described above. For example, in some embodiments, the $CO_2$-selective membrane can exhibit a $CO_2$:CO selectivity of from 500 to 3000 at 100° C. and 2 atm feed pressure (e.g., from 1000 to 2000 at 100° C. and 2 atm feed pressure, from 1000 to 3000 at 100° C. and 2 atm feed pressure, or from 1000 to 2000 at 100° C. and 2 atm feed pressure).

In some embodiments, the $CO_2$-selective membrane can exhibit a $CO_2$:CO selectivity of at least 100 (e.g., at least 125, at least 150, at least 175, at least 200, at least 225, at least 250, at least 275, at least 300, at least 325, at least 350, at least 375, at least 400, at least 425, at least 450, or at least 475) at 170° C. and 2 atm feed pressure. In some embodiments, the $CO_2$-selective membrane can exhibit a $CO_2$:CO selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, or 125 or less) at 170° C. and 2 atm feed pressure.

The $CO_2$-selective membrane can exhibit a $CO_2$:CO selectivity at 170° C. and 2 atm feed pressure ranging from any of the minimum values described above to any of the maximum values described above. For example, in some embodiments, the $CO_2$-selective membrane can exhibit a $CO_2$:CO selectivity of from 100 to 500 at 170° C. and 2 atm feed pressure (e.g., from 100 to 250 at 170° C. and 2 atm feed pressure).

In some embodiments, the $CO_2$-selective membrane can exhibit a $CO_2$:CO selectivity above, except measured at 1 atm feed pressure (instead of 2 atm feed pressure).

In some embodiments, the $CO_2$-selective membrane can exhibit a $CO_2$ permeability of at least 1500 Barrer (e.g., at least 1750 Barrer, at least 2000 Barrer, at least 2250 Barrer, at least 2500 Barrer, at least 2750 Barrer, at least 3000 Barrer, at least 3250 Barrer, at least 3500 Barrer, at least 3750 Barrer, at least 4000 Barrer, at least 4250 Barrer, at least 4500 Barrer, at least 4750 Barrer, at least 5000 Barrer, at least 5250 Barrer, at least 5500 Barrer, at least 5750 Barrer, at least 6000 Barrer, at least 6250 Barrer, at least 6500 Barrer, at least 6750 Barrer, at least 7000 Barrer, at least 7250 Barrer, at least 7500 Barrer, at least 7750 Barrer, at least 8000 Barrer, at least 8250 Barrer, at least 8500 Barrer, at least 8750 Barrer, at least 9000 Barrer, at least 9250 Barrer, at least 9500 Barrer, or at least 9750 Barrer) at 100° C. and 2 atm feed pressure. In some embodiments, the $CO_2$-selective membrane can exhibit a $CO_2$ permeability of 10000 Barrer or less (e.g., 9750 Barrer or less, 9500 Barrer or less, 9250 Barrer or less, 9000 Barrer or less, 8750 Barrer or less, 8500 Barrer or less, 8250 Barrer or less, 8000 Barrer or less, 7750 Barrer or less, 7500 Barrer or less, 7250 Barrer or less, 7000 Barrer or less, 6750 Barrer or less, 6500 Barrer or less, 6250 Barrer or less, 6000 Barrer or less, 5750 Barrer or less, 5500 Barrer or less, 5250 Barrer or less, 5000 Barrer or less, 4750 Barrer or less, 4500 Barrer or less, 4250 Barrer or less, 4000 Barrer or less, 3750 Barrer or less, 3500 Barrer or less, 3250 Barrer or less, 3000 Barrer or less, 2750 Barrer or less, 2500 Barrer or less, 2250 Barrer or less, 2000 Barrer or less, or 1750 Barrer or less) at 100° C. and 2 atm feed pressure.

The $CO_2$-selective membrane can exhibit a $CO_2$ permeability at 100° C. and 2 atm feed pressure ranging from any of the minimum values described above to any of the maximum values described above. For example, in some embodiments, the $CO_2$-selective membrane can exhibit a $CO_2$ permeability of from 1500 Barrer to 10000 Barrer at 100° C. and 2 atm feed pressure, such as a $CO_2$ permeability of from 2500 Barrer to 10000 Barrer at 100° C. and 2 atm feed pressure.

In some embodiments, the $CO_2$-selective membrane can exhibit a $CO_2$ permeability of at least 500 Barrer (e.g., at least 750 Barrer, at least 1000 Barrer, at least 1250 Barrer, at least 1500 Barrer, at least 1750 Barrer, at least 2000 Barrer, at least 2250 Barrer, at least 2500 Barrer, at least 2750 Barrer, at least 3000 Barrer, at least 3250 Barrer, at least 3500 Barrer, at least 3750 Barrer, at least 4000 Barrer, at least 4250 Barrer, at least 4500 Barrer, at least 4750 Barrer, at least 5000 Barrer, at least 5250 Barrer, at least 5500 Barrer, at least 5750 Barrer, at least 6000 Barrer, at least 6250 Barrer, at least 6500 Barrer, at least 6750 Barrer, at least 7000 Barrer, or at least 7250 Barrer) at 170° C. and 2 atm feed pressure. In some embodiments, the $CO_2$-selective membrane can exhibit a $CO_2$ permeability of 7500 Barrer or less (e.g., 7250 Barrer or less, 7000 Barrer or less, 6750 Barrer or less, 6500 Barrer or less, 6250 Barrer or less, 6000 Barrer or less, 5750 Barrer or less, 5500 Barrer or less, 5250 Barrer or less, 5000 Barrer or less, 4750 Barrer or less, 4500 Barrer or less, 4250 Barrer or less, 4000 Barrer or less, 3750 Barrer or less, 3500 Barrer or less, 3250 Barrer or less, 3000 Barrer or less, 2750 Barrer or less, 2500 Barrer or less, 2250 Barrer or less, 2000 Barrer or less, 1750 Barrer or less, 1500 Barrer or less, 1250 Barrer or less, 1000 Barrer or less, or 750 Barrer or less) at 170° C. and 2 atm feed pressure.

The $CO_2$-selective membrane can exhibit a $CO_2$ permeability at 170° C. and 2 atm feed pressure ranging from any of the minimum values described above to any of the maximum values described above. For example, in some embodiments, the $CO_2$-selective membrane can exhibit a $CO_2$ permeability of from 500 Barrer to 7500 Barrer at 170° C. and 2 atm feed pressure, or a $CO_2$ permeability of from 500 Barrer to 5000 Barrer at 170° C. and 2 atm feed pressure.

In some embodiments, the $CO_2$-selective membrane can exhibit a $CO_2$ permeability above, except measured at 1 atm feed pressure (instead of 2 atm feed pressure).

In some embodiments, a micro-porous or nano-porous (e.g., having an average pore size of less than 10 μm or less than 1 μm) hydrophobic barrier layer (or blocking layer) such as PTFE (Teflon with pores) can be used either as a support or as a protective barrier layer on either the retentate side, the permeate side, or both the retentate side and the permeate side of the $CO_2$-selective membrane. The hydrophobic blocking layer can exhibit a higher permeability to carbon dioxide than to water. This hydrophobic blocking layer prevents intrusion of water into the membrane and protects the membrane from damage.

Support Layers

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-isopropylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

Selective Polymer Layers

The selective polymer layer can comprise a hydrophilic polymer matrix and an amine-containing carrier dispersed therein. Optionally, the selective polymer matrix can further comprise additional components, such as a $CO_2$-philic ether, a graphene oxide, carbon nanotubes, or a combination thereof, dispersed within the polymer matrix.

The hydrophilic polymer can include any suitable hydrophilic polymer. Examples of hydrophilic polymers suitable for use in the selective polymer layer can include polyvinyl alcohol, polyvinyl acetate, polyethylene oxide, polyvinylpyrrolidone, polyacrylamine, a polyamine such as polyallylamine, polyvinylamine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da. In other embodiments, the hydrophilic polymer can be a high molecular weight hydrophilic polymer. For example, the hydrophilic polymer can have a weight average molecular weight of at least 500,000 Da (e.g., at least 700,000 Da, or at least 1,000,000 Da).

The selective polymer layer can comprise any suitable amount of the hydrophilic polymer. For example, in some cases, the selective polymer layer can comprise from 10% to 90% by weight (e.g., from 10% to 50% by weight, or from 10% to 30% by weight) hydrophilic polymer, based on the total weight of the components used to form the selective polymer layer.

The amine-containing carrier can comprise an amine-containing polymer, an amine-based mobile carrier, or a combination thereof. In some embodiments, the amine-containing carrier can comprise an amine-containing polymer. In some embodiments, the amine-containing carrier can comprise an amine-based mobile carrier. In certain embodiments, the amine-containing carrier can comprise both an amine-containing polymer and an amine-based mobile carrier.

In some embodiments, the amine-containing carrier can comprise an amine-containing polymer (also referred to herein as a "fixed carrier" or a "fixed-site carrier"). When present, the amine-containing polymer can have any suitable molecular weight. For example, the amine-containing polymer can have a weight average molecular weight of from 5,000 Da to 5,000,000 Da, or from 50,000 Da to 2,000,000 Da.

Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 2,000,000 Da).

The selective polymer layer can comprise any suitable amount of the amine-containing polymer. For example, in some cases, the selective polymer layer can comprise from 10% to 90% by weight (e.g., from 10% to 50% by weight, or from 10% to 30% by weight) amine-containing polymer, based on the total weight of the components used to form the selective polymer layer.

In some embodiments, the amine-containing carrier can comprise an amine-based mobile carrier. Suitable amine-containing mobile carriers can include small molecules comprising one or more primary amine moieties and/or one or more secondary amine moieties, such as an amino acid salt, that can serve as a "mobile carrier" for $CO_2$ within the polymer matrix.

In some embodiments, the amine-containing mobile carrier can have a molecular weight of 1,000 Da or less (e.g., 800 Da or less, 500 or less, 300 Da or less, or 250 Da or less). In some embodiments, the amine-containing mobile carrier can be non-volatile at the temperatures at which the membrane will be stored or used. For example, amine-containing mobile carrier can comprise a salt of a primary amine or a salt of a secondary amine.

In some cases, the amine-containing mobile carrier can include an aminoacid salt. The amino acid salt can be a salt of any suitable amino acid. The amino acid salt may be derived, for instance, from glycine, arginine, lysine, histidine, 6-aminohexanoic acid, proline, sarcosine, methionine, or taurine. In some cases, the amino acid salt can comprise a salt of a compound defined by the formula below

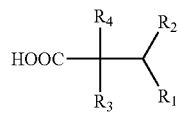

wherein, independently for each occurrence in the amino acid, each of $R_1$, $R_2$, $R_3$ and $R_4$ is selected from one of the following

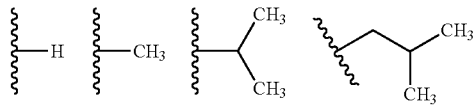

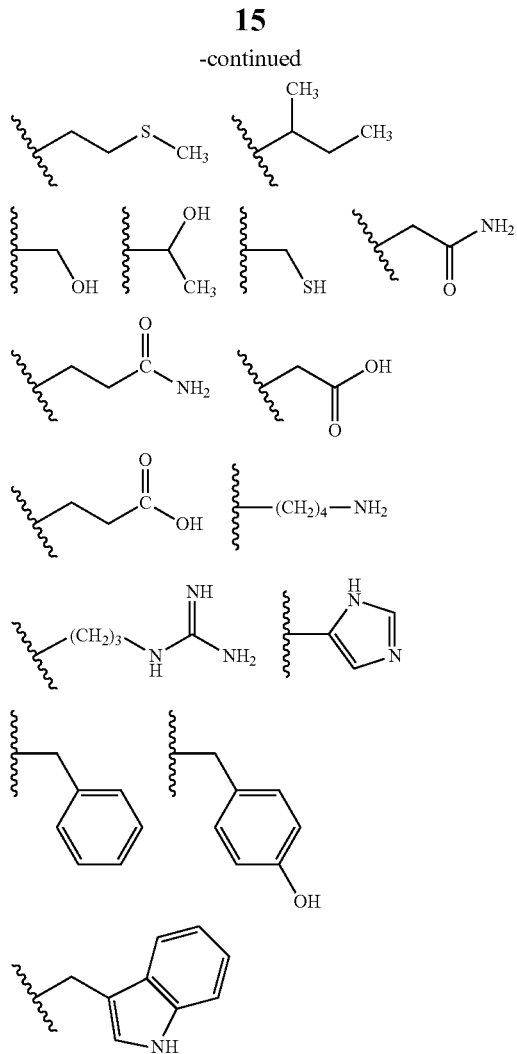

or $R_1$ and $R_3$, together with the atoms to which they are attached, form a five-membered heterocycle defined by the structure below when n is 1, or a six-membered heterocycle defined by the structure below when n is 2

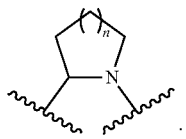

Poly(amino-acids), for example, polyarginine, polylysine, polyonithine, or polyhistidine may also be used to prepare the amino acid salt.

In other embodiments, the amine-containing mobile carrier can be defined by a formula below

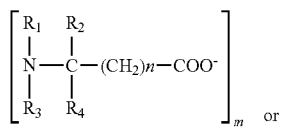 or

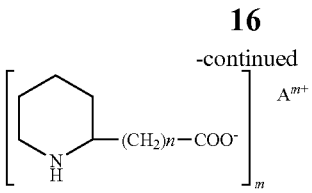

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3. In some cases, the cation ($A^{m+}$) can be an amine cation having the formula:

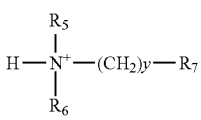

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, II, and IIIa of the Periodic Table of Elements or a transition metal. For example, $A^{m+}$ can comprise lithium, aluminum, or iron.

Other suitable amine-containing mobile carriers include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid- potassium salt, piperadine-2-carboxlic acid-lithium salt, piperadine-2-carboxlic acid-piperazine salt, piperadine-4-carboxlic acid- potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

Other suitable amine-containing mobile carriers include guanidine-based mobile carriers. The guanidine-based mobile carrier can comprise any suitable compound comprising a guanidine moiety and having a molecular weight of less than 1,000 Da (e.g., 800 Da or less, 500 or less, 300 Da or less, or 250 Da or less). In some embodiments, the guanidine-based mobile carrier can be a water-soluble compound. In some embodiments, the guanidine-containing mobile carrier can be non-volatile at the temperatures at which the membrane will be stored or used.

In some embodiments, the guanidine-based mobile carrier can be a compound defined by Formula I below Formula I

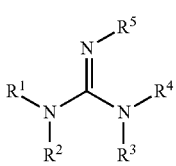

wherein
$R^1$ and $R^2$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^1$ and $R^2$, together with the N atom to which they are attached, form a 4-9 membered heterocycloalkyl group or a 5-6 membered heteroaryl group, each optionally substituted with 1, 2, or 3 independently selected $R^A$ groups;

$R^3$ and $R^4$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^3$ and $R^4$, together with the N atom to which they are attached, form a 4-9 membered heterocycloalkyl group or a 5-6 membered heteroaryl group, each optionally substituted with 1, 2, or 3 independently selected $R^A$ groups;

$R^5$ is selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkyl sulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, $R^1$, $R^2$, $R^3$, and $R^4$ are all $C_{1-4}$ alkyl (e.g., methyl).

In some embodiments, $R^5$ is H. In other embodiments, $R^5$ can be $C_{1-6}$ alkyl optionally substituted with 1, 2, 3, or 4 independently selected $R^A$ groups. For example, $R^5$ can be a $C_{1-6}$ alkyl group substituted with an OH group, or a $C_{1-6}$ alkyl group substituted with an amino group.

In some examples, the guanidine-based mobile carrier can comprise one of the following

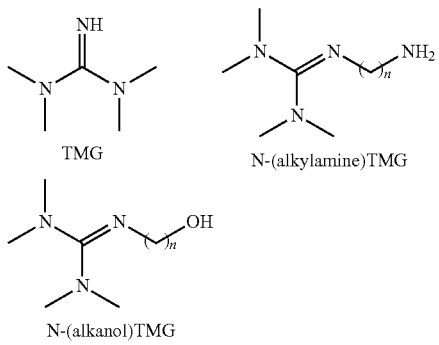

wherein n is an integer from 1 to 12, such as from 1 to 6.

Optionally, the selective polymeric layer can further include a one or more $CO_2$-philic ethers dispersed within the polymer matrix. The $CO_2$-philic ether can be a polymer, oligomer, or small molecule containing one or more ether linkages. Examples of $CO_2$-philic ethers include alcohol ethers, polyalkylene alcohol ethers, polyalkylene glycols, poly(oxyalkylene)glycols, poly(oxyalkylene)glycol ethers, ethoxylated phenol. In one embodiment, the $CO_2$-philic ether can comprise alkyl ethoxylate (C1-C6)-XEO X=1-30-linear or branched. In some embodiments, the $CO_2$-philic ether can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), or any combination thereof.

Optionally, the selective polymer layer can further include graphene oxide.

The term "graphene" refers to a one-atom-thick planar sheet of $sp^2$-bonded carbon atoms that are densely packed in a honeycomb crystal lattice. In one embodiment, it refers to a single-layer version of graphite.

The term "graphene oxide" herein refers to functionalized graphene sheets (FGS)—the oxidized compositions of graphite. These compositions are not defined by a single stoichiometry. Rather, upon oxidation of graphite, oxygen-containing functional groups (e.g., epoxide, carboxyl, and hydroxyl groups) are introduced onto the graphite. Complete oxidation is not needed. Functionalized graphene generally refers to graphene oxide, where the atomic carbon to oxygen ratio starts at approximately 2. This ratio can be increased by reaction with components in a medium, which can comprise a polymer, a polymer monomer resin, or a solvent, and/or by the application of radiant energy. As the carbon to oxygen ratio becomes very large (e.g. approaching 20 or above), the graphene oxide chemical composition approaches that of pure graphene.

The term "graphite oxide" includes "graphene oxide", which is a morphological subset of graphite oxide in the form of planar sheets. "Graphene oxide" refers to a graphene oxide material comprising either single-layer sheets or multiple-layer sheets of graphite oxide. Additionally, in one embodiment, a graphene oxide refers to a graphene oxide material that contains at least one single layer sheet in a portion thereof and at least one multiple layer sheet in another portion thereof. Graphene oxide refers to a range of possible compositions and stoichiometries. The carbon to oxygen ratio in graphene oxide plays a role in determining the properties of the graphene oxide, as well as any composite polymers containing the graphene oxide.

The abbreviation "GO" is used herein to refer to graphene oxide, and the notation GO(m) refers to graphene oxide having a C:O ratio of approximately "m", where m ranges from 3 to about 20, inclusive. For example, graphene oxide having a C:O ratio of between 3 and 20 is referred to as "GO(3) to GO(20)", where m ranges from 3 to 20, e.g. m=3, 4, 5, 6, 7, 8, 9, 10, 11, 12, 13, 14, 15, 16, 17, 18, 19 or 20, including all decimal fractions of 0.1 increments in between, e.g. a range of values of 3-20 includes 3.0, 3.1, 3.2, 3.3, 3.4, 3.5, 3.6, 3.7, 3.8, 3.9, 4.0, and so on up to 20. Thus, as used herein, the term GO(m) describes all graphene oxide compositions having a C:O ratio of from 3 to about 20. For example, a GO with a C:O ratio of 6 is referred to as GO(6), and a GO with a C:O ratio of 8, is referred to as GO(8), and both fall within the definition of GO(m).

As used herein, "GO(L)" refers to low C:O ratio graphene oxides having a C:O ratio of approximately "L", wherein L is less than 3, e.g., in the range of from about 1, including 1, up to 3, and not including 3, e.g. about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or about 2.9. In many embodiments, a GO(L) material has a C:O ratio of approximately 2. The designations for the materials in the GO(L) group is the same as that of the GO(m) materials described above, e.g. "GO(2)" refers to graphene oxide with a C:O ratio of 2.

In some embodiments, the graphene oxide can be GO(m). In some embodiments, the graphene oxide can be GO(L). In some embodiments, the graphene oxide can be nanoporous.

In some embodiments, the hydrophilic polymer matrix can further include a cross-linking agent. Cross-linking agents suitable for use in the polymer matrix can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, a silane, an aminosilane, and combinations thereof. In some embodiments, the cross-linking agent can comprise formaldehyde, glutaraldehyde, or maleic anhydride. The hydrophilic polymer matrix can comprise any suitable amount of the cross-linking agent. For example, the hydrophilic polymer matrix can comprise 1 to 40 percent cross-linking agents by weight of the polymer matrix.

The hydrophilic polymer matrix can further include a base. The base can act as a catalyst to catalyze the cross-linking of the hydrophilic polymer matrix (e.g., cross-linking of a hydrophilic polymer with an amine-containing polymer). In some embodiments, the base can remain in the polymer matrix and constitute a part of the hydrophilic polymer matrix. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The hydrophilic polymer matrix can comprise any suitable amount of the base. For example, the polymer matrix can comprise 1 to 40 percent base by weight of the polymer matrix.

The selective polymer layer further comprises carbon nanotubes dispersed within the hydrophilic polymer matrix. Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 µm, at least 5 µm, at least 10 µm, or at least 15 µm). In some cases, the carbon nanotubes can have an average length of 20 µm or less (e.g., 15 µm or less, 10 µm or less, 5 µm or less, 1 µm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 µm (e.g., from 200 nm to 20 µm, or from 500 nm to 10 µm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then couple to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less) by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of Making

The $CO_2$-selective membranes described herein can be made using conventional methods known in the art. Methods of making membranes can include depositing (e.g., coating) a selective polymer layer on a support layer to form a selective layer disposed (e.g., coated) on the support layer. The selective polymer layer can comprise a polymer matrix and an amine-containing carrier dispersed within the polymer matrix.

Optionally, the support layer can be pretreated prior to deposition (e.g., coating) of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the polymer matrix (e.g., a hydrophilic polymer and an amine-containing carrier) and optionally one or more additional components (e.g., a $CO_2$-philic ether, graphene oxide, carbon nanotubes, a cross-linking agent, a basic compound, or a combination thereof) in a suitable solvent. One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating includes a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating includes a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from a polymer matrix comprising for example, a hydrophilic polymer, an amine-containing carrier, a cross-linking agent, and a base can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the polymer matrix after solvent removal takes place at about 100° C. to about 180° C., and the cross-linking occurs in from about 1 to about 72 hours.

In some embodiments, the method of making these membranes can be scaled to industrial levels.

Methods of Use

The membranes disclosed herein can be used for separating gaseous mixtures of $CO_2$ and CO. For example, provided are methods for separating $CO_2$ and CO that comprise contacting a $CO_2$-selective membrane described herein with a feed gas stream comprising $CO_2$ and CO under conditions effective to afford transmembrane permeation of the $CO_2$. In this way, carbon dioxide present in the feed gas stream passes through the $CO_2$-selective membrane to reach the permeate side of the $CO_2$-selective membrane while CO remains on the retentate side of the $CO_2$-selective membrane. This can produce a CO-enriched gas stream on the retentate side of the membrane and a $CO_2$-enriched gas stream on the permeate side of the membrane. In some embodiments, the feed gas stream comprises exhaust gas from a fuel cell, such as a solid oxide fuel cell. In some embodiments, the method can further comprise recycling the CO-enriched gas stream, the $CO_2$-enriched gas stream, or a combination thereof back into inlet streams of a solid oxide fuel cell In some embodiments, the method can also include withdrawing from the reverse side of the membrane a permeate comprising $CO_2$ gas, wherein the $CO_2$ gas is selectively removed from the feed gas stream. The permeate can comprise at least the $CO_2$ in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate mixtures of $CO_2$ and CO at any suitable temperature, including temperatures of 100° C. or greater. For example, the membrane can be used at temperatures of from 100° C. to 180° C. In some embodiments, a vacuum can be applied to the permeate face of the membrane to remove the $CO_2$. In some embodiments, a sweep gas can be flowed across the permeate face of the membrane to remove the $CO_2$. Any suitable sweep gas can be used. Examples of suitable sweep gases include, for example, air, steam, nitrogen, argon, helium, and combinations thereof.

The membranes described herein can be used in conjunction with conventional fuel cell systems. Example fuel cell systems include those in which a fuel inlet stream and a carbon dioxide inlet stream are provided to a high temperature fuel cell stack. The anode and/or cathode exhaust streams can be subjected to separation using a carbon dioxide separator. The carbon dioxide separator can comprise a $CO_2$-selective membrane described herein which removes $CO_2$ from the exhaust streams to generate a CO-enriched gas stream on the retentate side of the membrane and a $CO_2$-enriched gas stream on the permeate side of the membrane. The $CO_2$-enriched gas stream can then be recycled back into the carbon dioxide inlet stream of the high temperature fuel cell stack, increasing the efficiency of the high temperature fuel cell stack. Optionally, the CO-enriched gas stream can also be recycled back into the fuel inlet stream of the high temperature fuel cell stack, further increasing the efficiency of the high temperature fuel cell stack.

Figure 9A:
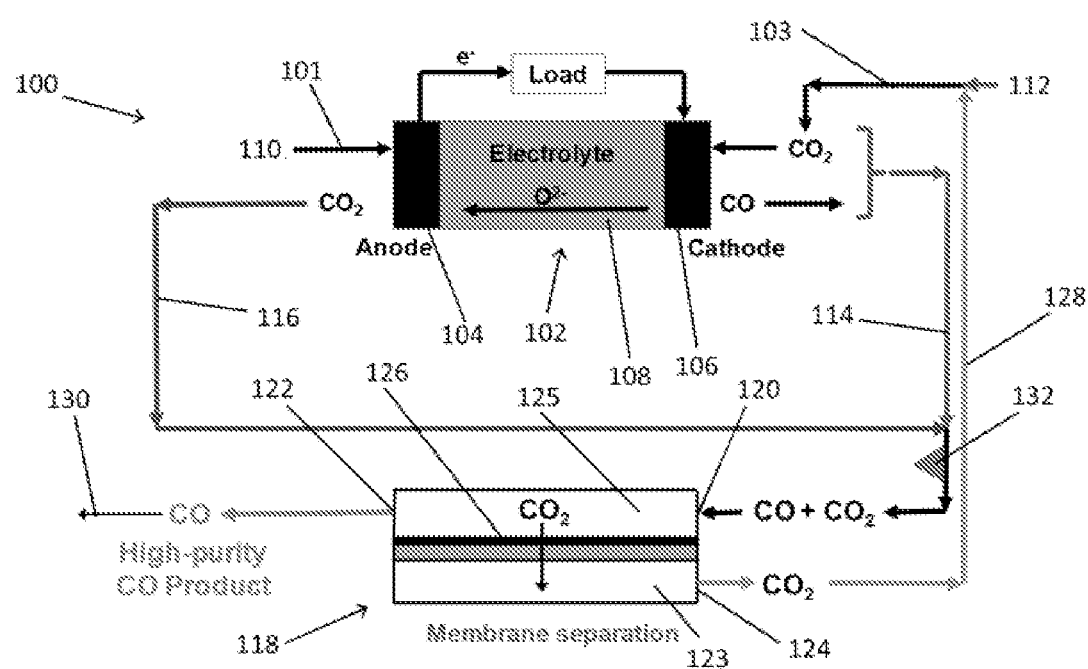
FIGS. 9A-9B illustrate example fuel cell systems incorporating the $CO_2$-selective membranes described herein.
Figure 9B:
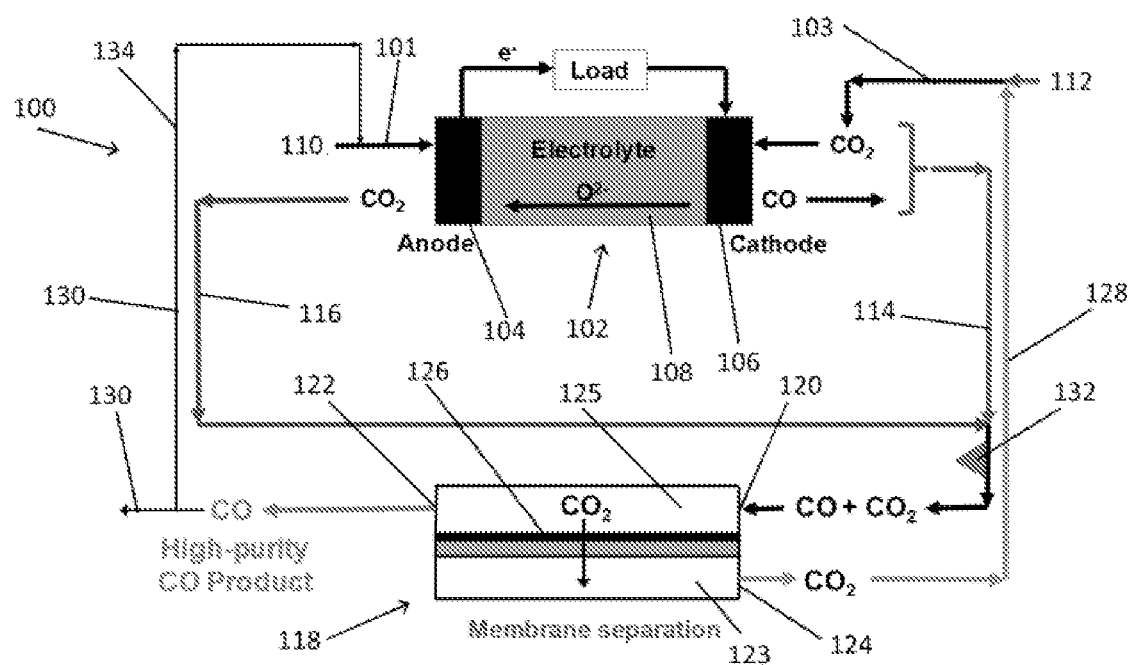

As such, the $CO_2$-selective membranes described herein may be used together with a fuel cell system, such as a solid oxide fuel cell (SOFC) system. It should be noted that other fuel cell systems, such as molten carbonate systems, may also be used. FIGS. 9A-9B illustrate the use of the membranes described herein for separation of $CO_2$ and CO in conjunction with an example fuel cell system. Referring now to FIG. 9A, example fuel cell systems 100 can comprise high temperature fuel cell stack systems, such as a solid oxide fuel cell (SOFC) systems. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 can include a high temperature fuel cell stack 102. The stack may contain a plurality of SOFCs or SORFCs. The high temperature fuel cell stack 102 is illustrated schematically to show one solid oxide fuel cell of the stack containing a ceramic electrolyte 108, such as yttria or scandia stabilized zirconia, an anode electrode 104, such as a nickel-stabilized zirconia cermet, and a cathode electrode 106, such as lanthanum strontium manganite. Each fuel cell contains an electrolyte, an anode electrode on one side of the electrolyte, a cathode electrode on the other side of the electrolyte. The stack also contains other components, such as interconnects (e.g., separator plates/electrical contacts), seals, etc. In an SOFC operating in the fuel cell mode, carbon dioxide enters the cathode chamber (e.g., a space between a cathode electrode and ribs of an adjacent interconnect), while the fuel (e.g., a hydrocarbon such as methane) enters the anode chamber (e.g., a space between an anode electrode and ribs of an adjacent interconnect). Any suitable fuel cell designs and component materials may be used.

The system 100 can operate as follows. The fuel inlet stream 110 is provided into the fuel cell stack 106 through fuel inlet conduit 101. The fuel may comprise any suitable fuel, such as a hydrogen fuel or a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. In some embodiments, the fuel can comprise methane. In some embodiments, the fuel can comprise carbon monoxide. In some embodiments, the fuel can comprise ethane. In some embodiments, the fuel can comprise propane. In some embodiments, the fuel can comprise ethylene. The fuel inlet conduit 102 provides the fuel inlet stream to the anode side of the fuel cell stack 106.

A carbon dioxide inlet stream 112 is provided into the stack 106 through a carbon dioxide inlet conduit 103. The carbon dioxide inlet stream can comprise pure carbon dioxide, or any suitable mixture of gases comprising carbon dioxide. The carbon dioxide inlet conduit 103 provides carbon dioxide to the cathode side of the fuel cell stack 106.

Once the fuel and carbon dioxide (oxidant) are provided into the fuel cell stack 106, the stack 106 is operated to generate electricity and a fuel exhaust stream. The fuel exhaust stream may contain a mixture of species, including hydrogen, water vapor, carbon monoxide, carbon dioxide, some un-reacted hydrocarbon gas, such as methane, and other reaction by-products and impurities. The fuel exhaust stream (i.e., the stack anode exhaust stream) can be provided from the stack 106 via fuel exhaust conduit 16. The $CO_2$ exhaust stream (i.e., the stack cathode exhaust stream) is provided from the stack air exhaust outlet via cathode exhaust conduit 114.

The fuel exhaust conduit 116 and/or the cathode exhaust conduit 114 can be fluidly connected to $CO_2$ separator 118, so as to direct the fuel exhaust stream and/or the $CO_2$ exhaust stream to the $CO_2$ separator 118. In some embodiments, as shown in FIG. 9A, both the fuel exhaust conduit 116 and the cathode exhaust conduit 114 are fluidly connected to $CO_2$ separator 118, so as to direct both the fuel exhaust stream and the $CO_2$ exhaust stream to the $CO_2$ separator 118. In other embodiments, only the cathode exhaust conduit 114 is fluidly connected to $CO_2$ separator 118, so as to direct the $CO_2$ exhaust stream to the $CO_2$ separator 118. In these embodiments, the fuel exhaust stream can be diverted elsewhere (e.g., for isolation of components from the fuel exhaust stream). In other embodiments, only the fuel exhaust conduit 116 is fluidly connected to $CO_2$ separator 118, so as to direct the fuel exhaust stream to the $CO_2$ separator 118. In these embodiments, the $CO_2$ exhaust stream can be diverted elsewhere (e.g., for isolation of components from the fuel exhaust stream).

Optionally, a recirculation blower 132 may be coupled to the fuel exhaust conduit 116, the cathode exhaust conduit 114, or a combination thereof to direct the fuel exhaust stream and/or the $CO_2$ exhaust stream to the $CO_2$ separator 118. The recirculation blower 132 may be computer or operator controlled and may vary the amount and/or rate of the fuel exhaust stream and/or $CO_2$ exhaust stream being provided to the $CO_2$ separator 118 and also the amount and/or rate at which the CO-enriched gas stream on and/or the $CO_2$-enriched gas stream generated by the $CO_2$ separator are provided back to the stack 106. As such, the recirculation blower 132 may be used to increase or decrease the overall recycling rate in system 100.

The fuel exhaust stream and/or the $CO_2$ exhaust stream enter the $CO_2$ separator 118 via separator inlet 120 and contacts a $CO_2$-selective membrane 126. The $CO_2$-selective membrane can be selectively permeable to carbon dioxide, such that carbon dioxide passes through the $CO_2$-selective membrane to reach the permeate side of the $CO_2$-selective membrane 123 (also referred to as the permeate channel) while CO remains on the retentate side of the $CO_2$-selective membrane 125 (also referred to as the retentate channel). Suitable $CO_2$-selective membranes are discussed in more detail below. If desired, reduced pressure (e.g., a vacuum) and/or a sweep gas can be used to increase transmembrane permeation of carbon dioxide. In this way, $CO_2$ separator 118 generates a CO-enriched gas stream on the retentate side of $CO_2$-selective membrane 125 (in the retentate channel) and a $CO_2$-enriched gas stream on the permeate side of $CO_2$-selective membrane 123 (in the permeate channel). Following separation, the $CO_2$-enriched gas stream can be directed out of the $CO_2$ separator 118 via permeate outlet 124 and the CO-enriched gas stream can be directed out of the $CO_2$ separator 118 via retentate outlet 122.

The CO-enriched gas stream exiting the carbon dioxide separator 118 via retentate outlet 122 can contains less carbon dioxide than the exhaust stream(s) that entered the carbon dioxide separator 118 via separator inlet 120. Preferably, the carbon dioxide separator 118 removes substantially all the carbon dioxide from exhaust stream(s) that entered the separation. The carbon dioxide separator 118 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the exhaust stream(s). In some embodiments, the CO-enriched gas stream can comprise at least 50% by volume CO (e.g., at least 55% by volume CO, at least 60% by volume CO, at least 65% by volume CO, at least 70% by volume CO, at least 75% by volume CO, at least 80% by volume CO, at least 85% by volume CO, at least 90% by volume CO, at least 95% by volume CO, at least 98% by volume CO, at least 99% by volume CO, or at least 99.5% by volume CO). In some embodiments, other gases (e.g., water and/or other hydrocarbons) may be present in the CO-enriched gas stream.

Likewise, the $CO_2$-enriched gas stream exiting the carbon dioxide separator 118 via permeate outlet 124 can include a higher concentration of carbon dioxide than the exhaust stream(s) that entered the carbon dioxide separator 118 via separator inlet 120. In some embodiments, the $CO_2$-enriched gas stream can comprise at least 50% by volume $CO_2$ (e.g., at least 55% by volume $CO_2$, at least 60% by volume $CO_2$, at least 65% by volume $CO_2$, at least 70% by volume $CO_2$, at least 75% by volume $CO_2$, at least 80% by volume $CO_2$, at least 85% by volume $CO_2$, at least 90% by volume $CO_2$, at least 95% by volume $CO_2$, at least 98% by volume $CO_2$, at least 99% by volume $CO_2$, or at least 99.5% by volume $CO_2$).

Following separation, the $CO_2$-enriched gas stream can be directed out of the $CO_2$ separator 118 via permeate outlet 124. The $CO_2$-enriched gas stream can then flow through the cathode recycling conduit 128 to rejoin the carbon dioxide inlet stream 112. The CO-enriched gas stream can flow to a CO-stream outlet 130, which can provide a CO-enriched gas feedstock for any desired use downstream. Alternatively, in some embodiments as shown in FIG. 9B, the CO-enriched gas stream can flow through an anode recycling conduit 134 to rejoin the fuel inlet stream 110.

The fuel cell systems may have other embodiments and configurations, as desired. Other components, such as fuel side exhaust stream condensers, ATO reactors, heat exchangers, humidifiers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Elements of these systems can be combined with the systems described in U.S. Patent Application Publication No. 2019/0140297, which is hereby incorporated herein by reference in its entirety. Furthermore, it should be understood that any system element or method steps described in any embodiment and/or illustrated in any figure may also be used in systems and/or methods of other suitable embodiments described above even if such use is not expressly described.

By way of non-limiting illustration, examples of certain embodiments of the present disclosure are given below.

EXAMPLES

Overview

Described herein are systems and methods for $CO_2$ utilization for CO production via a fuel cell system that is enabled by a $CO_2$-selective membrane. We have synthesized highly $CO_2$-selective membranes, showing an extraordinarily high $CO_2/CO$ selectivity of greater than 1200 at 100-130° C. that separates a $CO_2$ and CO mixture to give high-purity $CO_2$ on the permeate side and high-purity CO on the retentate side. An embodiment of the $CO_2$ utilization is for the simultaneous production of CO and electricity using natural gas, i.e., methane ($CH_4$) feeding to the anode of a solid oxide fuel cell (SOFC). In this case, the $CO_2$ feed enters the cathode of the SOFC, where the $CO_2$ is converted to CO. As the conversion is not 100%, the cathode exhaust is typically a mixture of $CO_2$ and CO. This mixture enters a $CO_2$-selective membrane module, which separates the mixture to a high-purity CO product on the retentate side and a high-purity $CO_2$ stream on the vacuum permeate side. The methane enters the anode of the SOFC, which is oxidized into $CO_2$ while generating electrons to produce electricity via the external circuit (load). The $CO_2$ stream coming out from the anode may contain some CO due to incomplete oxidation of methane. The mixture produced at the anode may be sent to the same $CO_2$-selective membrane module or another for separation. The separated $CO_2$ product may combine with the $CO_2$ feed to go into the cathode. The methane feed may be converted to ethylene.

Instead of the methane feed, the feed to the anode is paraffin, e.g., ethane or propane, for conversion to olefin, e.g., ethylene or propylene, or CO for conversion to $CO_2$ that is captured by the membrane.

Fuel Cell Architectures

Disclosed are systems and methods for $CO_2$ utilization for CO production via a fuel cell system that utilizes a $CO_2$-selective membrane. FIG. 1 shows an embodiment of the $CO_2$ utilization schematically for the simultaneous production of CO and electricity using natural gas, i.e., methane ($CH_4$) feeding to the anode of a solid oxide fuel cell (SOFC). As shown in FIG. 1, the $CO_2$ feed enters the cathode of the SOFC, where the $CO_2$ (combining with 2 electrons) is converted into CO and an oxide ion ($O^{2-}$). As the conversion is not 100%, the cathode exhaust is typically a mixture of $CO_2$ and CO. This mixture enters a $CO_2$-selective membrane module, which separates the mixture to a high-purity CO product on the retentate side and a high-purity $CO_2$ stream on the vacuum permeate side. The methane enters the anode of the SOFC, which is oxidized into $CO_2$ by 4 oxide ions ($O^{2-}$) coming from the cathode while generating 8 electrons to produce electricity via the external circuit (load). The $CO_2$ stream coming out from the anode may contain some CO due to incomplete oxidation of methane. The mixture produced at the anode may be sent to the same $CO_2$-selective membrane module or another $CO_2$-selective membrane module to separate it to a high-purity CO product on the retentate side and a high-purity $CO_2$ stream on the vacuum permeate side. The high-purity $CO_2$ stream may combine with the $CO_2$ feed to go into the cathode of the SOFC.

Figure 2:
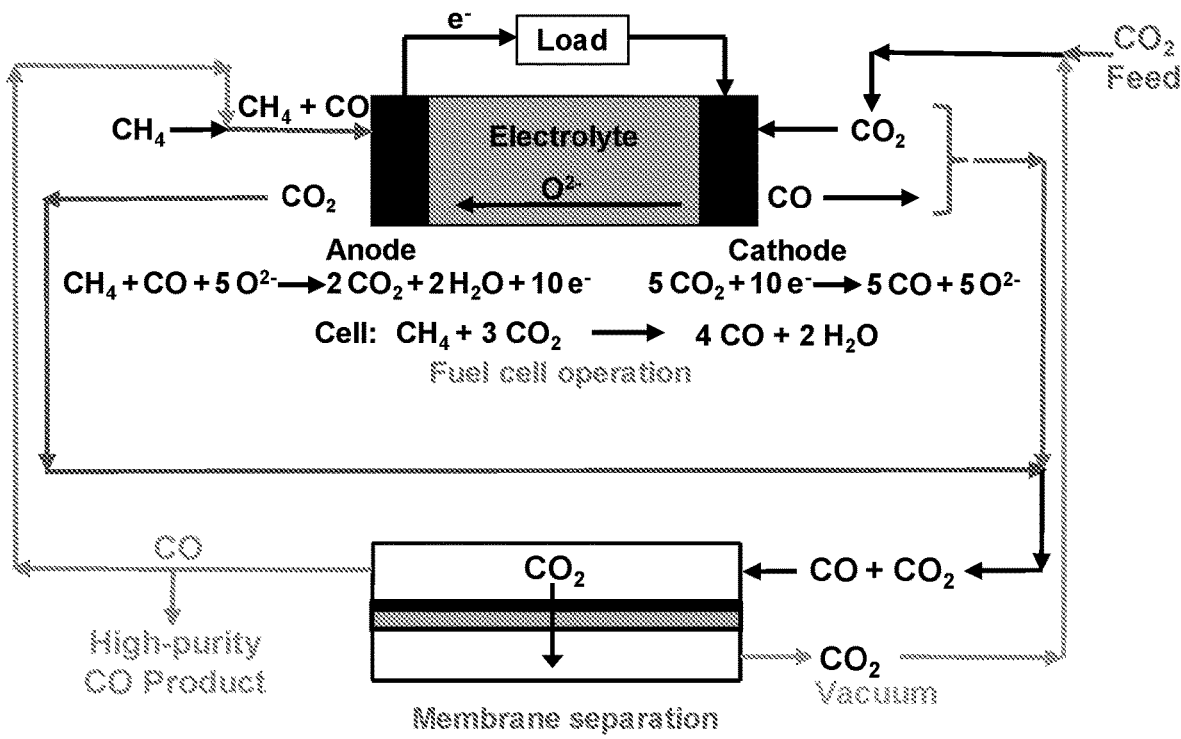
FIG. 2 is a schematic of $CO_2$ utilization via fuel cell with $CH_4$ enabled by a $CO_2$-selective membrane to give high-purity CO for use in electricity generation.

Another embodiment of $CO_2$ utilization in a similar way described above is shown schematically in FIG. 2. As shown in this figure, a part of the high-purity CO separated from the $CO_2$-selective membrane unit is sent to the anode of the SOFC to be together with $CH_4$ for conversion to $CO_2$. The CO and $CH_4$ entering the anode of the SOFC are oxidized into $CO_2$ by 1 and 4 oxide ions ($O^{2-}$), respectively, coming from the cathode while generating 10 electrons to produce electricity via the external circuit (load). In a similar way as shown in FIG. 1, the $CO_2$ feed enters the cathode of the SOFC, where the $CO_2$ (combing with 2 electrons) is converted into CO and an oxide ion ($O^{2-}$). As the conversion is not 100%, the cathode exhaust is typically a mixture of $CO_2$ and CO. This mixture enters a $CO_2$-selective membrane module, which separates the mixture to a high-purity CO product on the retentate side and a high-purity $CO_2$ stream on the vacuum permeate side. The $CO_2$ stream coming out from the anode may contain some CO due to incomplete oxidation of CO and $CH_4$. The mixture produced at the anode may be sent to the same $CO_2$-selective membrane module or another $CO_2$-selective membrane module to separate it to a high-purity CO product on the retentate side and a high-purity $CO_2$ stream on the vacuum permeate side. The high-purity $CO_2$ stream may combine with the $CO_2$ feed to go into the cathode of the SOFC.

Figure 3:
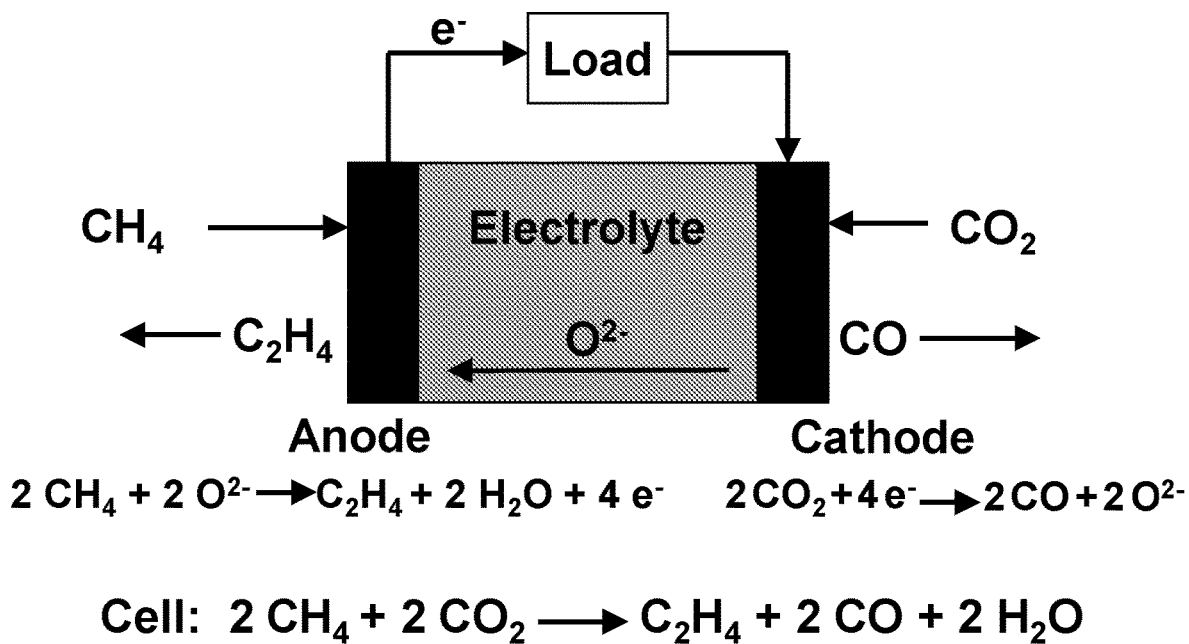
FIG. 3 is a schematic of $CO_2$ utilization via fuel cell for $CH_4$ conversion to ethylene enabled by a $CO_2$-selective membrane to give high-purity CO.

Yet there is another embodiment of $CO_2$ utilization as shown schematically in FIG. 3. As shown in this figure, the $CH_4$ entering the anode of the SOFC is oxidized partially to $C_2H_4$ at the stoichiometric ratio of 2 moles of $CH_4$ by 2 moles of oxide ion ($O^{2-}$) coming from the cathode while generating 4 electrons to produce electricity via the external circuit (load). In a similar way as shown in FIG. 1, the $CO_2$ feed enters the cathode of the SOFC, where the $CO_2$ (combing with 2 electrons) is converted into CO and an oxide ion ($O^{2-}$). As the conversion is not 100%, the cathode exhaust is typically a mixture of $CO_2$ and CO. This mixture enters a $CO_2$-selective membrane module, which separates the mixture to a high-purity CO product on the retentate side and a high-purity $CO_2$ stream on the vacuum permeate side. The high-purity $CO_2$ stream may combine with the $CO_2$ feed to go into the cathode of the SOFC.

Figure 4:
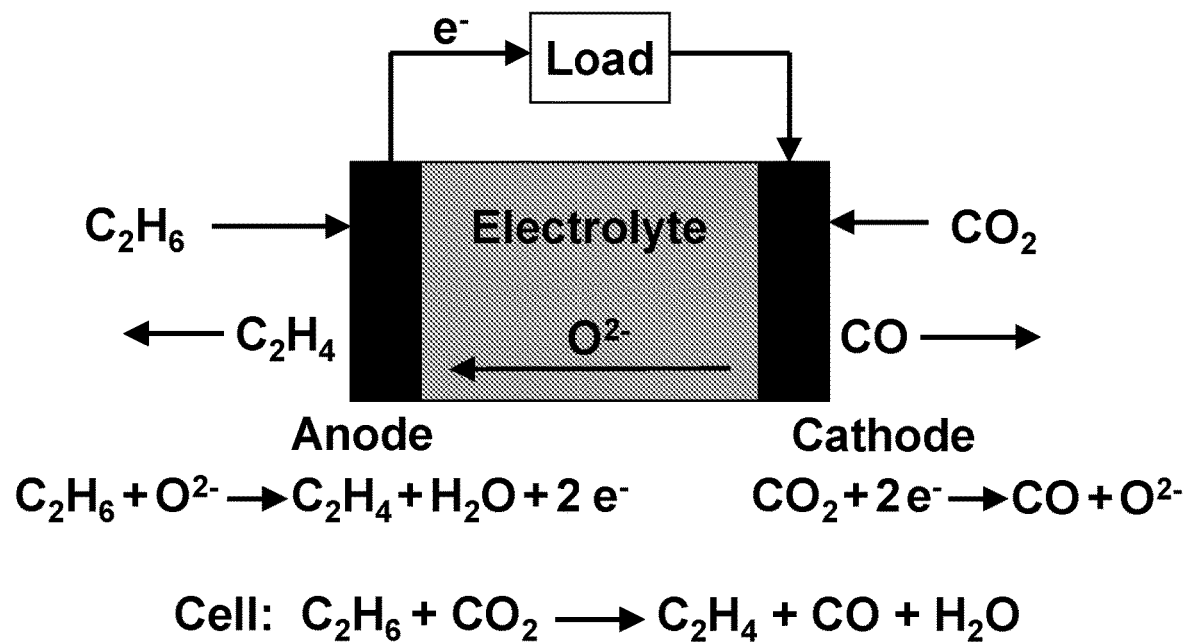
FIG. 4 is a schematic of $CO_2$ utilization via fuel cell for ethane conversion to ethylene enabled by a $CO_2$-selective membrane to give high-purity CO.

Moreover, there is another embodiment of $CO_2$ utilization as shown schematically in FIG. 4. For this case, paraffin is converted to olefin, e.g., ethane conversion to ethylene on the anode side. As shown in this figure, the $C_2H_6$ entering the anode of the SOFC is oxidized partially to $C_2H_4$ at the stoichiometric ratio of 1 mole of $C_2H_6$ by 1 mole of oxide ion ($O^{2-}$) coming from the cathode while generating 2 electrons to produce electricity via the external circuit (load). In a similar way as shown in FIG. 1, the $CO_2$ feed enters the cathode of the SOFC, where the $CO_2$ (combing with 2 electrons) is converted into CO and an oxide ion ($O^{2-}$). As the conversion is not 100%, the cathode exhaust is typically a mixture of $CO_2$ and CO. This mixture enters a $CO_2$-selective membrane module, which separates the mixture to a high-purity CO product on the retentate side and a high-purity $CO_2$ stream on the vacuum permeate side. The high-purity $CO_2$ stream may combine with the $CO_2$ feed to go into the cathode of the SOFC.

Figure 5:
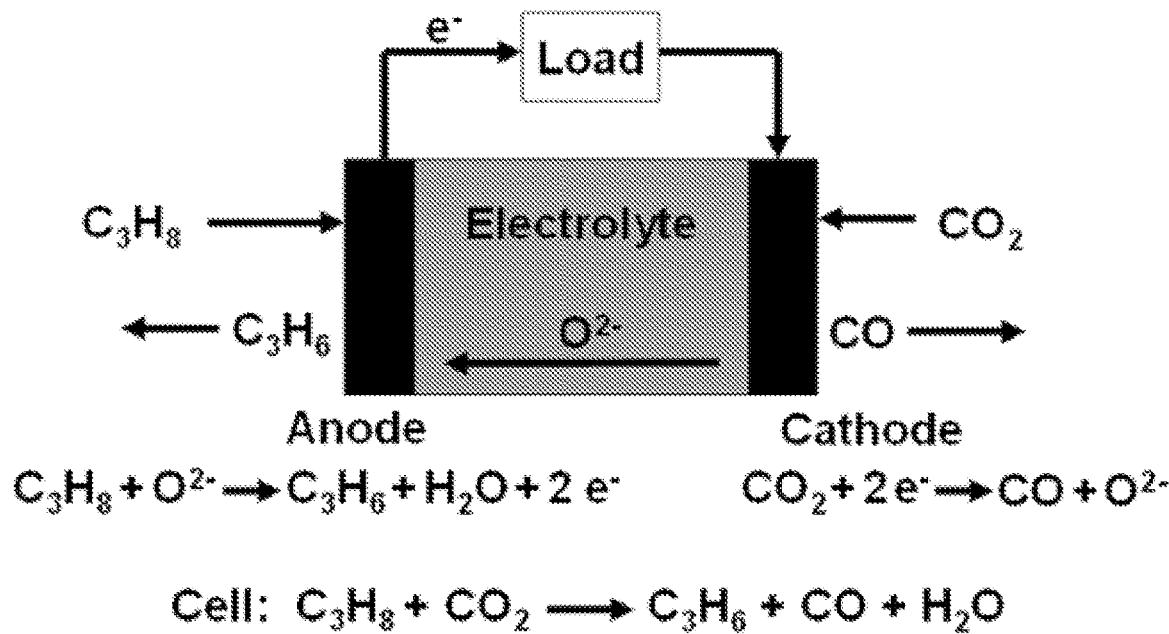
FIG. 5 is a schematic of $CO_2$ utilization via fuel cell for propane conversion to propylene enabled by a $CO_2$-selective membrane to give high-purity CO.

Furthermore, there is another embodiment of $CO_2$ utilization as shown schematically in FIG. 5. For this case, propane is converted to propylene on the anode side. As shown in this figure, the $C_3H_8$ entering the anode of the SOFC is oxidized partially to $C_3H_6$ at the stoichiometric ratio of 1 mole of $C_3H_8$ by 1 mole of oxide ion ($O^{2-}$) coming from the cathode while generating 2 electrons to produce electricity via the external circuit (load). In a similar way as shown in FIG. 1, the $CO_2$ feed enters the cathode of the SOFC, where the $CO_2$ (combing with 2 electrons) is converted into CO and an oxide ion ($O^{2-}$). As the conversion is not 100%, the cathode exhaust is typically a mixture of $CO_2$ and CO. This mixture enters a $CO_2$-selective membrane module, which separates the mixture to a high-purity CO product on the retentate side and a high-purity $CO_2$ stream on the vacuum permeate side. The high-purity $CO_2$ stream may combine with the $CO_2$ feed to go into the cathode of the SOFC.

Figure 6:
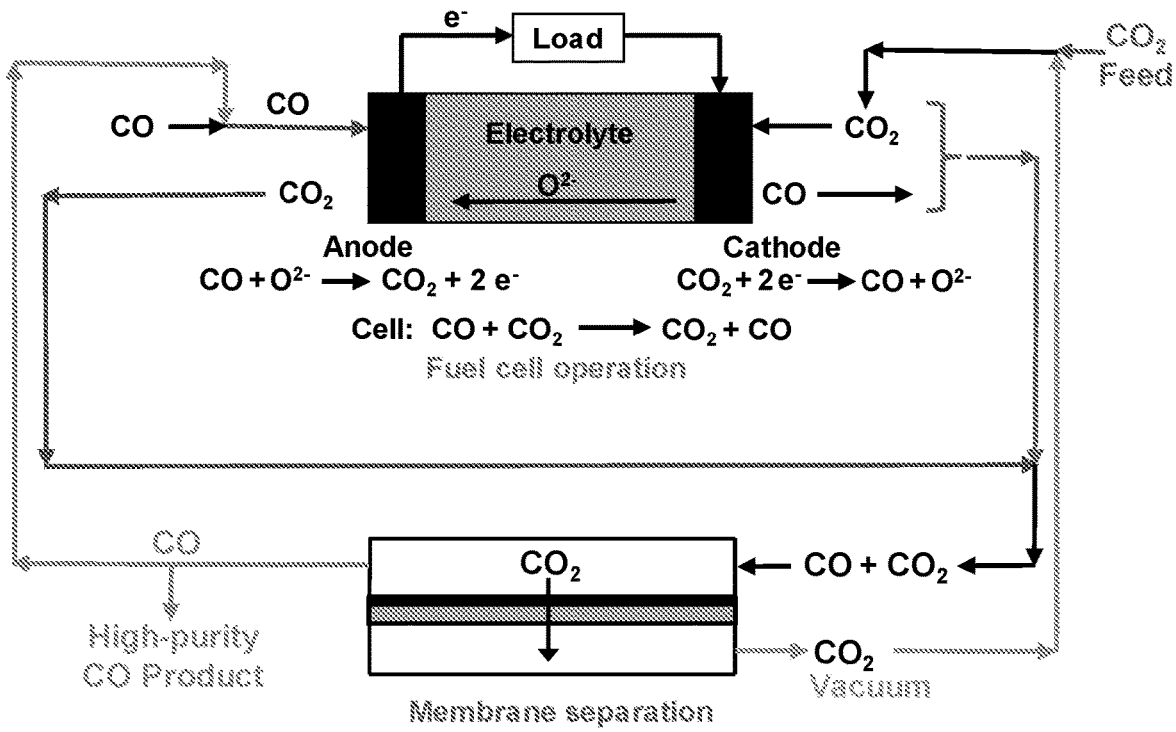
FIG. 6 is a schematic of $CO_2$ utilization via fuel cell enabled by a $CO_2$-selective membrane.

In addition, there is another embodiment of $CO_2$ utilization as shown schematically in FIG. 6. As shown in this figure, the CO feed entering the anode of the SOFC is oxidized into $CO_2$ by 1 oxide ion ($O^{2-}$) coming from the cathode while generating 2 electrons to produce electricity via the external circuit (load). In a similar way as shown in FIG. 1, the $CO_2$ feed enters the cathode of the SOFC, where the $CO_2$ (combing with 2 electrons) is converted into CO and an oxide ion ($O^{2-}$). The conversion is not 100%, resulting in a mixture of $CO_2$ and CO. This mixture enters a $CO_2$-selective membrane module, which separates the mixture to a high-purity CO product on the retentate side and a high-purity $CO_2$ stream on the vacuum permeate side. A part of the high-purity CO separated from the $CO_2$-selective membrane unit may be sent to the anode of the SOFC to be together with CO feed for conversion to $CO_2$. The $CO_2$ stream coming out from the anode may contain some CO due to incomplete oxidation of CO. The mixture produced at the anode may be sent to the same $CO_2$-selective membrane module or another $CO_2$-selective membrane module to separate it to a high-purity CO product on the retentate side and a high-purity $CO_2$ stream on the vacuum permeate side. The high-purity $CO_2$ stream may combine with the $CO_2$ feed to go into the cathode of the SOFC.

$CO_2$-Selective Membranes—General Considerations

Suitable $CO_2$-selective membranes can include a selective polymer that comprises a hydrophilic polymer matrix and an amine-containing carrier dispersed therein.

The hydrophilic polymer matrix can comprise, for example, polyvinyl alcohol, polyvinyl acetate, polyethylene oxide, polyvinylpyrrolidone, polyacrylamide, blends thereof, and copolymers thereof. The hydrophilic polymer matrix may further comprise a crosslinker, such as formaldehyde, glutaraldehyde, glyoxal, divinylsulfone, toluenediisocyanate, trimethylol melamine, terephthalaldehyde, epichlorohydrin, vinyl acrylate, maleic anhydride, and blends thereof.

The amine-containing carrier can comprise an amine-containing polymer, an amine-containing mobile carrier, or a combination thereof. Examples of suitable amine-containing polymers include polyvinylamine, modified polyvinylamines (poly-N-methylvinylamine, poly-N,N-dimethylvinylamine, poly-N-ethylvinylamine, poly-N-isopropylvinylamine, and poly-N-n-propylvinylamine), polyallylamine, modified polyallylamines (poly-N-methylallylamine, poly-N,N-dimethylallylamine, poly-N-ethylallylamine, poly-N-i sopropylallylamine, and poly-N-n-propylallylamine), polyethylenimine, poly-2-vinylpiperidine, poly-4-vinylpiperidine, and blends and copolymers thereof. Examples of suitable amine-containing mobile carriers include salts formed from an amine or a base with an aminoacid, where the amine is selected from a group consisting of piperazine, 2-(1-piperazinyl)ethylamine, ethylenediamine, diethylenetriamine, triethylenetetramine, tetramethylguanidine, and blends thereof, where the base is selected from a group consisting of KOH, NaOH, LiOH, CsOH, $NH_4OH$, and blends thereof, and where the aminoacid is selected from a group consisting of aminoisobutyric acid, sarcosine, glycine, proline, lysine, arginine, histidine, aspartic acid, glutamic acid, serine, threonine, asparagine, glutamine, cysteine, selenocysteine, alanine, valine, isoleucine, leucine, methioline, phenylalanine, tyrosine, tryptophan, pipecolinic acid, N,N-dimethylglycine, and blends thereof.

In the examples, the separation factor (selectivity) for $CO_2$ vs. CO is expressed as follows:

$$\text{Seperation Factor} = \frac{CO_2/CO \text{ concentration ratio in the permeate}}{CO_2/CO \text{ concentration ratio in the retentate}}$$

The retentate refers to the mixture on the feed side of the membrane that is rejected/retained by the membrane under the operating conditions. Similarly, the separation factor for $CO_2$ vs. hydrogen is expressed as follows:

$$\text{Seperation Factor} = \frac{CO_2/H_2 \text{ concentration ratio in the permeate}}{CO_2/H_2 \text{ concentration ratio in the retentate}}$$

The flux, expressed in units of $cm^3$ (STP)/($cm^2 \cdot s$), is related to the permeability, expressed in units of Barrer (1 Barrer=$10^{-10}$ $cm^3$ (STP)·cm/($cm^2 \cdot s \cdot cm$ Hg)), in the following equation:

$$\text{Flux} = \text{Permeability } (p_1 - p_2)/\ell$$

where $p_1$ and $p_2$ are the carbon dioxide partial pressures in the retentate and permeate streams, respectively, and $\ell$ is the membrane thickness. The partial pressures are determined based on concentration measurements by gas chromatography and total pressure measurements by using pressure gauges. The flux is determined based on concentration measurements by gas chromatography and permeate stream flow rate measurements by using a flow meter.

Preparation of Example $CO_2$-Selective Membrane 1

A membrane was synthesized using 27.2 wt. % Aminoisobutyric Acid-K Salt, 10.1 wt. % Polyallylamine, 45.9 wt. % (Polyvinylalcohol/Formaldehyde at 44/9 by weight) and 16.8 wt. % KOH as described below.

Briefly, to 50.588 g of water was added 8.800 g of polyvinylalcohol (PVA) with stirring and heating at about 80° C. until a clear solution of the polymer was obtained. To this PVA solution were added an aqueous 37 wt. % formaldehyde solution of 4.868 g (1.801 g of formaldehyde) and an aqueous KOH solution containing 3.880 g KOH and 3.933 g water under stirring. The resulting solution was heated at about 80° C. and maintained at this temperature with stirring for 6 hours to enhance the crosslinking of PVA with formaldehyde, catalyzed by KOH. In this solution, the KOH concentration was about 5.4 wt. %. The PVA/formaldehyde weight ratio of 8.800/1.801, i.e., 44 (PVA monomer molecular weight)/9 (30% of formaldehyde molecular weight), corresponds to a maximum PVA crosslinking degree of 60%. Separately, an aminoisobutyric acid-K salt solution was prepared by adding 4.480 g (0.044 mole) of aminoisobutyric acid and 2.580 g (0.046 mole) of KOH slowly to 5.284 g of water with stirring. A polyallylamine solution was prepared by adding 2.327 g polyallylamine in 15.234 g water. To the above PVA/formaldehyde/KOH solution were added the aminoisobutyric acid-K salt solution and the polyallylamine solution under stirring at about 80° C. for about 30 minutes to obtain a clear, homogeneous solution. The solution was then centrifuged at 8000 ppm while cooling for 10 minutes. After the centrifugation, the solution was knife-coated (with a gap setting of 11 mils) to make the membrane onto a support of microporous polytetrafluoroethylene. Water was allowed to evaporate from the membrane in a hood at ambient conditions overnight. The membrane was then heated in an oven at 120° C. for about 6 hours. The resulting membrane comprised about 27.2 wt. % aminoisobutyric acid-K salt, 10.1 wt. % polyallylamine, 45.9 wt. % (polyvinylalcohol/formaldehyde at 44/9 by weight), and 16.8 wt. % KOH. The membrane had a thickness of about 26 microns (exclusive of the support).

Permeation Measurements using Example $CO_2$-Selective Membrane 1

A gas permeation apparatus was used to measure the permeability of carbon dioxide and the separation factor (selectivity) of carbon dioxide vs. CO (or hydrogen). Briefly, the membrane was placed in a permeation cell comprising the first compartment for contacting a feed stream on the upstream side of the membrane and the second compartment for withdrawing the permeate from the downstream side of the membrane. The active membrane area in the cell was 45.6 cm². A feed gas comprising 20% carbon dioxide, 40% hydrogen, and 40% nitrogen (on the dry basis) under a total pressure of about 2 atm was contacted against the membrane at a flow rate of about 60 cm³/min (at ambient condition) in the gas permeation apparatus. The permeate was swept by nitrogen under a pressure of about 1 atm and a total flow rate of about 30 cm³/min for the permeate/nitrogen stream. Both the feed and sweep streams were humidified by injecting 0.03 ml/min of deionized water into each of the two streams prior to contacting the membrane. Each permeation measurement was carried out at an operating temperature.

Example $CO_2$-Selective Membrane 1 (comprising about 27.2 wt. % aminoisobutyric acid-K salt, 10.1 wt. % polyallylamine, 45.9 wt. % (polyvinylalcohol/formaldehyde at 44/9 by weight), and 16.8 wt. % KOH) (with a thickness of about 26 microns) was evaluated as described above. The carbon dioxide/hydrogen selectivity and carbon dioxide permeability results obtained at 120-170° C. are shown in Table 1.

TABLE 1

The carbon dioxide/hydrogen selectivity and carbon dioxide permeability results for Example $CO_2$-Selective Membrane 1.

| Temperature (° C.) | Carbon Dioxide/Hydrogen Selectivity | Carbon Dioxide Permeability (Barrer) |
|---|---|---|
| 120 | 262 | 6196 |
| 130 | 193 | 3922 |
| 140 | 161 | 4463 |
| 150 | 80 | 3651 |
| 160 | 67 | 3039 |
| 170 | 53 | 2241 |

As shown in Table 1, Example $CO_2$-Selective Membrane 1 exhibited a very high selectivity of carbon dioxide vs. hydrogen as well as very high carbon dioxide permeability. Thus, this membrane is very useful for the removal of carbon dioxide from the hydrogen-containing synthesis gas comprising carbon dioxide to increase the concentration of hydrogen for hydrogen purification and enhancement.

Figure 7:
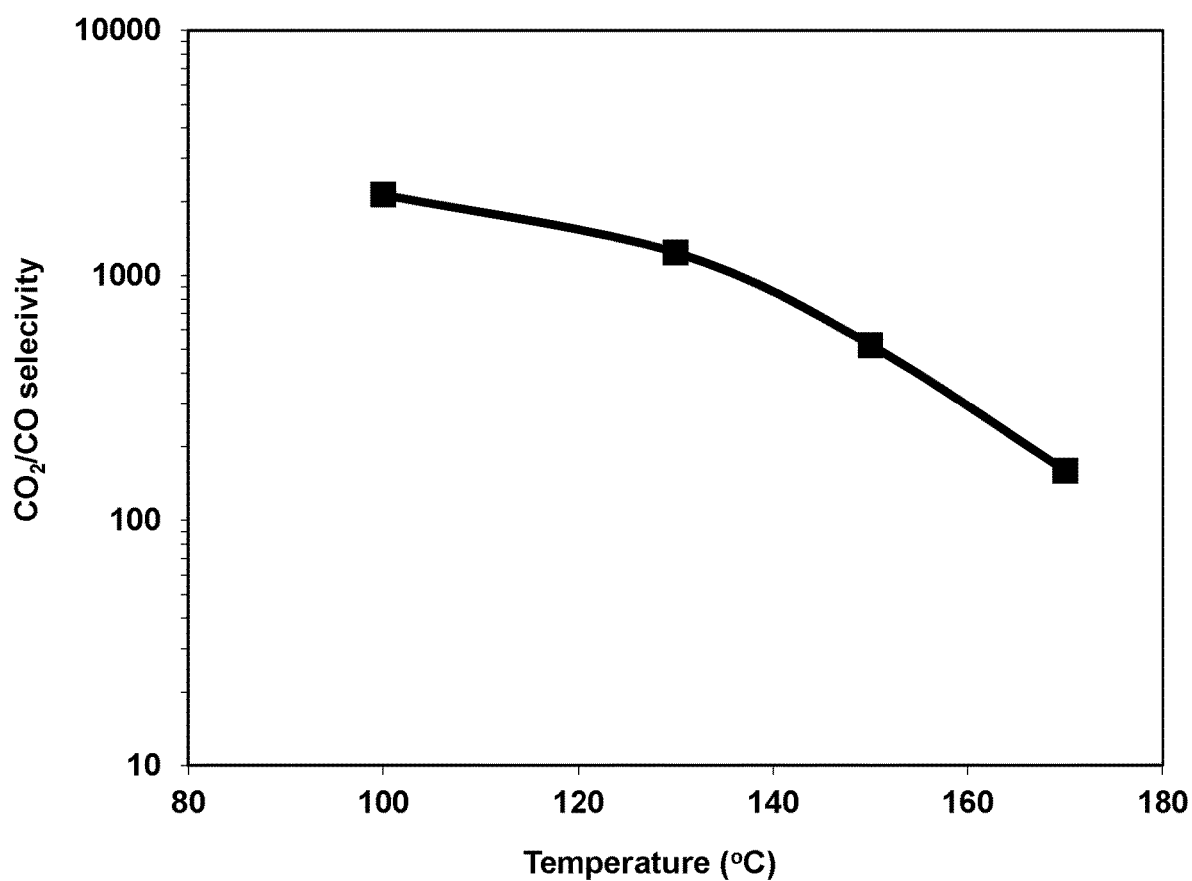
FIG. 7 is a plot showing the $CO_2/CO$ selectivity of an example membrane as a function of temperature (at feed pressure=2.0 atm).

The $CO_2$/CO selectivity of Example $CO_2$-Selective Membrane 1 was investigated with a feed gas of 17% $CO_2$, 1.0% CO, 45% $H_2$, and 37% $N_2$ from 100° C. to 170° C. As shown in FIG. 7, the selectivity was very high, greater than 1200 at temperatures ranging from 100 to 130° C. This membrane is very useful for the separation of a $CO_2$ and CO mixture to obtain high-purity $CO_2$ on the permeate side and high-purity CO on the retentate side. However, the selectivity reduced as temperature increased, which can be explained by the decrease of $CO_2$ permeability at elevated temperatures. However, even at 170° C., the $CO_2$/CO selectivity was about 160, which is still very high.

Preparation of Example $CO_2$-Selective Membrane 2

A membrane containing 2-(1-Piperazinyl)ethylamine sarcosinate was synthesized

Briefly, PVA was first dissolved in DI water at 80° C. under stirring. A stoichiometric amount of glutaraldehyde and a certain amount of KOH were added into the PVA aqueous solution to achieve a 100 mol % degree of crosslinking, based on the hydroxyl groups of PVA. The PVA/glutaraldehyde/KOH solution was heated at 80° C. for 3 h under stirring. The aminoacid salt mobile carriers were synthesized by reacting a base, 2-(1-Piperazinyl)ethylamine (PZEA), with an aminoacid, sarcosine (Sar). The stoichiometric amount of Sar was added in a 24 wt. % PZEA aqueous solution under vigorous mixing. The solution was mixed at room temperature for 2 h before use.

To form the membrane dope, 3-g polyvinylamine aqueous solution (4 wt. %) was added in 1 g of crosslinked PVA aqueous solution (8 wt. % crosslinked PVA, 4.4 wt. % KOH) dropwise under vigorous agitation. The PZEA-Sar aqueous solution (43.19 wt. %) of 0.222 g was added in the dispersion to form a homogeneous coating solution. A centrifugation at 8,000×g for 3 min was conducted to remove any air bubbles entrapped in the coating solution. The coating solution was coated on a nanoporous polysulfone (PSf) substrate by a GARDCO adjustable micrometer film applicator, resulting in a selective layer thickness of 25 μm. The membrane was dried in a fume hood at room temperature for 30 min and then cured at 120° C. for 6 h.

Permeation Measurements using Example $CO_2$-Selective Membrane 2

Figure 8:
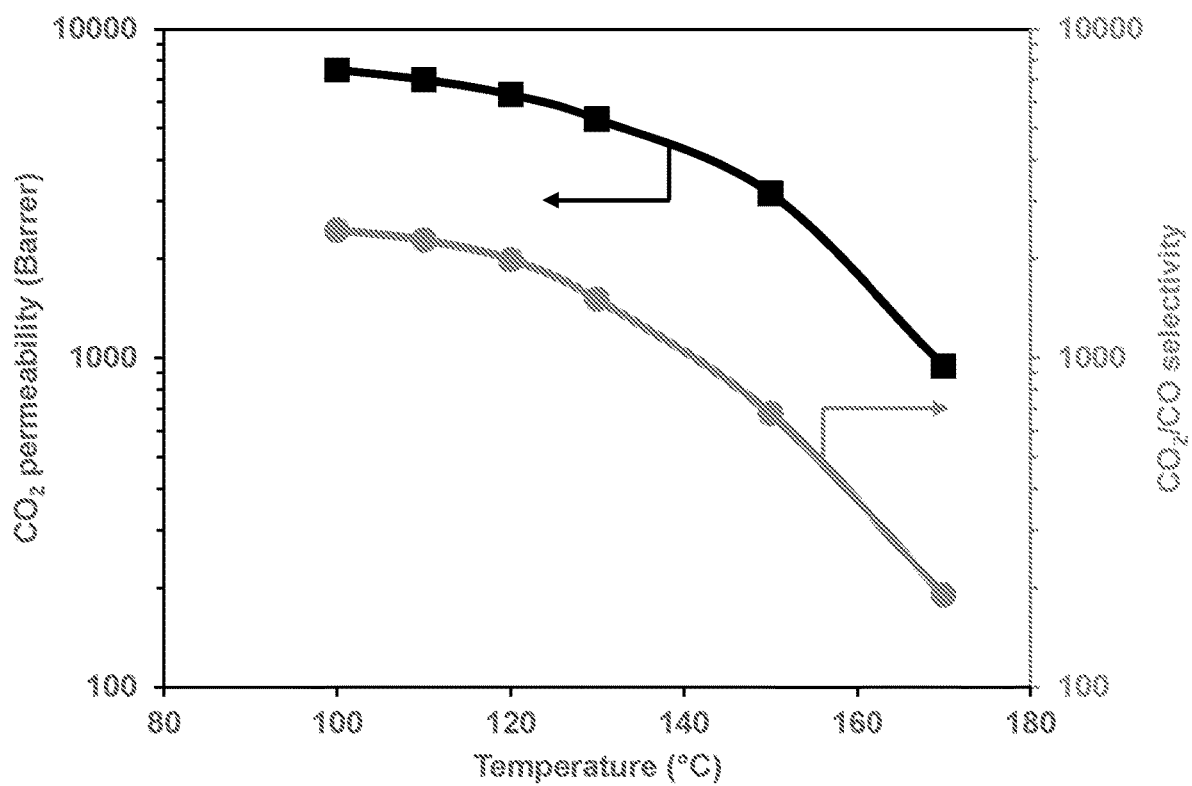
FIG. 8 is a plot showing the $CO_2/CO$ separation performance of an example membrane as a function of temperature (at feed pressure=2.0 atm).

The $CO_2$/CO separation performance of Example $CO_2$-Selective Membrane 2 was investigated with a feed gas of 59.5% $CO_2$, 14.0% CO, and 26.5% $H_2$ from 100° C. to 170° C. As shown in FIG. 8, the selectivity was very high, greater than 1500 at temperatures ranging from 100 to 130° C. This membrane is very useful for the separation of a $CO_2$ and CO mixture to obtain high-purity $CO_2$ on the permeate side and high-purity CO on the retentate side. But, the selectivity reduced as temperature increased, which can be explained by the decrease of $CO_2$ permeability at elevated temperatures. However, even at 170° C., the $CO_2$/CO selectivity was 191, which is still very high.

The compositions, systems, and methods of the appended claims are not limited in scope by the specific compositions, systems, and methods described herein, which are intended as illustrations of a few aspects of the claims. Any compositions, systems, and methods that are functionally equivalent are intended to fall within the scope of the claims.

Various modifications of the compositions, systems, and methods in addition to those shown and described herein are intended to fall within the scope of the appended claims. Further, while only certain representative compositions, systems, and method steps disclosed herein are specifically described, other combinations of the compositions, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A $CO_2$-selective membrane for the separation of $CO_2$ and CO, the membrane comprising:
   a support layer; and
   a selective polymer layer disposed on the support layer, the selective polymer layer comprising a hydrophilic polymer matrix and an amine-containing carrier dispersed therein, wherein the amine-containing carrier comprises an amine-containing mobile carrier; and
   wherein the $CO_2$-selective membrane exhibits a $CO_2$: CO selectivity of at least 500 at 100° C. and 2 atm feed pressure; and
   wherein the amine-containing mobile carrier comprises a salt formed by reaction of an amine or a base with an amino acid,
   wherein the amine is selected from a group consisting of piperazine, 2-(1-piperazinyl) ethylamine, ethylenediamine, diethylenetriamine, triethylenetetramine, tetramethylguanidine, and blends thereof,
   wherein the base is selected from a group consisting of KOH, NaOH, LiOH, CsOH, $NH_4OH$, and blends thereof; and
   wherein the amino acid is selected from a group consisting of sarcosine, glycine, proline, lysine, arginine, histidine, aspartic acid, glutamic acid, serine, threonine, asparagine, glutamine, cysteine, selenocysteine, alanine, valine, isoleucine, leucine, methionine, phenylalanine, tyrosine, tryptophan, pipecolinic acid, N,N-dimethylglycine, and blends thereof.

2. The membrane of claim 1, wherein the $CO_2$-selective membrane exhibits a $CO_2$: CO selectivity of at least 100 at 170° C. and 2 atm feed pressure.

3. The membrane of claim 1, wherein the $CO_2$-selective membrane exhibits a $CO_2$ permeability of at least 1500 Barrer at 100° C. and 2 atm feed pressure.

4. The membrane of claim 1, wherein the $CO_2$-selective membrane exhibits a $CO_2$ permeability of at least 500 Barrer at 170° C. and 2 atm feed pressure.

5. The membrane of claim 1, wherein the hydrophilic polymer comprises a polymer selected from the group consisting of polyvinyl alcohol, polyvinyl acetate, polyethylene oxide, polyvinylpyrrolidone, polyacrylamine, a polysiloxane, copolymers thereof, and blends thereof.

6. The membrane of claim 1, wherein the amine-containing carrier further comprises an amine-containing polymer.

7. The membrane of claim 6, wherein the amine-containing polymer is selected from the group consisting of polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers thereof, and blends thereof.

8. The membrane of claim 1, wherein the amine-containing mobile carrier further comprises a salt defined by a general formula below

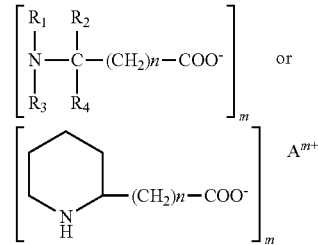

wherein $R_1$, $R_2$, $R_3$, and $R_4$ are hydrogen or hydrocarbon groups having from 1 to 4 carbon atoms, n is an integer ranging from 0 to 4, and $A^{m+}$ is a cation having a valence of 1 to 3, and m is an integer equal to the valence of the cation.

9. The membrane of claim 1, wherein the amine-containing mobile carrier further comprises a salt selected from the group consisting of aminoisobutyric acid-potassium salt, aminoisobutyric acid-lithium salt, aminoisobutyric acid-piperazine salt, dimethylglycine-potassium salt, dimethylglycine-lithium salt, dimethylglycine-piperazine salt, piperidine-2-carboxylic acid-potassium salt, piperidine-2-carboxylic acid-lithium salt, piperidine-2-carboxylic acid-piperazine salt, piperidine-4-carboxylic acid-potassium salt, piperidine-4-carboxylic acid-lithium salt, piperidine-4-carboxylic acid-piperazine salt, piperidine-3-carboxylic acid-potassium salt, piperidine-3-carboxylic acid-lithium salt, piperidine-3-carboxylic acid-piperazine salt, and blends thereof.

10. The membrane of claim 1, wherein the amine-containing mobile carrier comprises a glycinate salt, a sarcosinate salt.

11. The membrane of claim 1, wherein the selective polymer layer further comprises a cross-linking agent.

12. The membrane of claim 1, wherein the membrane further comprises a hydrophobic blocking layer disposed on the support layer, disposed between the support layer and the selective polymer layer, disposed on the selective polymer layer, or any combination thereof.

13. The membrane of claim 1, wherein the membrane is used with a solid oxide fuel cell system to convert $CO_2$ to CO.

14. A method of separating $CO_2$ and CO, the method comprising
    contacting a membrane defined by claim 1 with a feed gas stream comprising $CO_2$ and CO under conditions effective to afford transmembrane permeation of the $CO_2$.

15. The membrane of claim 1, wherein the amine-containing mobile carrier comprises a sarcosinate salt.

* * * * *